(12) United States Patent
Fujikawa

(10) Patent No.: US 10,025,148 B2
(45) Date of Patent: Jul. 17, 2018

(54) DISPLAY DEVICE WITH SIGNAL LINES ROUTED TO DECREASE SIZE OF NON-DISPLAY AREA

(71) Applicant: Sharp Kabushiki Kaisha, Sakai, Osaka (JP)

(72) Inventor: Yohsuke Fujikawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/666,598

(22) Filed: Aug. 2, 2017

(65) Prior Publication Data

US 2017/0329172 A1  Nov. 16, 2017

Related U.S. Application Data

(63) Continuation of application No. 15/376,779, filed on Dec. 13, 2016, now Pat. No. 9,766,518, which is a
(Continued)

(30) Foreign Application Priority Data

Jul. 20, 2012  (JP) ................................. 2012-161657

(51) Int. Cl.
*G02F 1/1345* (2006.01)
*G09G 3/36* (2006.01)
(Continued)

(52) U.S. Cl.
CPC ........ *G02F 1/13454* (2013.01); *G02F 1/1309* (2013.01); *G02F 1/13452* (2013.01);
(Continued)

(58) Field of Classification Search
CPC ............. G02F 1/13454; G02F 1/13452; G02F 2001/13456; G09G 2300/0426
See application file for complete search history.

(56) References Cited

U.S. PATENT DOCUMENTS

2004/0135205 A1\* 7/2004 Jung .................... H01L 27/1285
257/350
2008/0106835 A1\* 5/2008 Ker .................... G02F 1/136204
361/56
(Continued)

OTHER PUBLICATIONS

Fujikawa, "Display Device With Signal Lines Routed to Decrease Size of Non-Display Area", U.S. Appl. No. 15/376,779, filed Dec. 13, 2016.

*Primary Examiner* — Larry Lee
(74) *Attorney, Agent, or Firm* — Keating & Bennett, LLP

(57) ABSTRACT

A display device includes a display panel, a panel driver, panel-side output terminals, image signal lines, and control signal lines. The terminals are disposed in a non-display area of the display device and connected to the panel driver. The image signal lines are routed in the non-display area from the terminals to cross a long edge of the panel driver and spread in a fan-like form toward the display area. The control signal lines including first lines and second lines are routed in the non-display area from the terminals toward a display area of the display device. The first lines are routed from the terminals to cross the long edge and along the image signal lines toward the display area. The second lines each including portions having a width larger than the first lines are routed from the terminals to cross a short edge of the panel driver.

17 Claims, 11 Drawing Sheets

Related U.S. Application Data continuation of application No. 14/408,353, filed as application No. PCT/JP2013/069112 on Jul. 12, 2013, now Pat. No. 9,524,683.

(51) Int. Cl.
*G02F 1/13* (2006.01)
*G09G 3/00* (2006.01)
*G02F 1/1362* (2006.01)
*G02F 1/1368* (2006.01)

(52) U.S. Cl.
CPC ....... *G02F 1/136204* (2013.01); *G09G 3/006* (2013.01); *G09G 3/3648* (2013.01); *G02F 1/1368* (2013.01); *G02F 2001/13456* (2013.01); *G02F 2202/104* (2013.01); *G09G 2300/0426* (2013.01); *G09G 2310/08* (2013.01); *G09G 2330/02* (2013.01)

(56) References Cited

U.S. PATENT DOCUMENTS

2008/0303776 A1* 12/2008 Jung ..................... G02F 1/1345
345/100
2011/0275270 A1* 11/2011 Matsuoka ............. G02F 1/1345
445/2

* cited by examiner

DISPLAY DEVICE WITH SIGNAL LINES ROUTED TO DECREASE SIZE OF NON-DISPLAY AREA

TECHNICAL FIELD

The present invention relates to a display device.

BACKGROUND ART

Personal digital assistants such as mobile phones, smartphones, and tablet computers or electronic devices such as computers include display devices including display panels such as liquid crystal panels. Each of such display devices includes a display panel and a drive. The display panel includes a display area for displaying images. The driver includes a Large-Scale Integrated circuit (LSI) configured to process input signals from a signal source and send generated output signals to the display area for driving the display panel. In general, it is preferable to use a chip on glass (COG) technology to directly mount a driver on a display panel in a non-display area outside a display area in display devices classified as small and medium sized display devices. An example of a display device of this kind is a display device disclosed in Patent Document 1.

RELATED ART DOCUMENT

Patent Document

Patent Document 1: Japanese Unexamined Patent Application Publication No. 2010-243524

Problem to be Solved by the Invention

A display device such as one that is described above includes panel-side output terminals, image signal lines, and control signal lines in a non-display area of a display panel. The panel-side output terminals are connected to an output terminal portion of the driver that is long in the horizontal direction. The image signal lines and the control signal lines are routed from the panel-side output terminals toward the display area in a fan-like form. The panel-side output terminals are provided in a large number corresponding to definition (resolution) of the display area. The panel-side output terminals are arranged parallel to each other along the long-side direction of the driver. The image signal lines and the control signal lines are routed from the panel-side output terminals toward the display area in a fan like form. When the number of the image signal lines is increased to improve the definition of the display area, a distance between the panel-side output terminals and the display area needs to be increased for routing the image signal lines and the control signal lines so as not to cross each other. This increases a size of the non-display area and thus overall sizes of the display panel and the display device increase or a frame area increases.

DISCLOSURE OF THE PRESENT INVENTION

The present invention was made in view of the above circumstances. An object of the present invention is to keep the size of a non-display area small.

Means for Solving the Problem

A display device according to the present invention includes a display panel, a panel driver, panel-side output terminals, image signal lines, control signal lines, first control signal lines, and second control signal lines. The display panel includes a display area configured to display images and a non-display area outside the display area. The panel driver is mounted in the non-display. The panel driver is configured to drive the display panel by processing input signals supplied by an external signal source and inputting output signals generated from the input signals to the display panel. The panel driver has an elongated shape with a longitudinal direction thereof along an edge of the display panel. The panel-side output terminals is disposed in the non-display area and connected to the panel driver. The image signal lines are disposed in the non-display area. The image signal lines are routed from the panel-side image output terminals so as to cross a long edge of the panel driver and spread in a fan-like form toward the display area. The image signal lines are configured to transmit image signals included in the output signals. The control signal lines disposed in the non-display area and routed from the panel-side output terminals toward the display area. The control signal lines are configured to transmit control signals included in the output signals. The control signal lines include first control signal lines and second control signal lines. The first control signal lines are routed from the panel-side output terminals so as to cross the long edge of the panel driver and along the image signal lines toward the display area. The second control signal lines are routed from the panel-side output terminals so as to cross a short edge of the panel driver. Each of the second control signal lines has at least a portion, a width of which is larger than a width of the first control signal lines.

According to the configuration, the panel driver mounted in the non-display area of the display panel processes the input signals from the external signal source and generates the output signals. The panel driver outputs the output signals. The panel-side output terminals are connected to the panel driver. Therefore, the output signals including image signals and control signals from the panel driver are transmitted to the display area through the image signal lines and the control signal lines via the panel-side output terminals. With this configuration, the display panel is driven.

In the non-display area, the image signal lines described above are routed from the panel-side output terminals so as to cross the long edge of the panel driver and to spread in a fan-like form toward the display area. If all control signal lines are routed along image signal lines that spread in a fan-like form toward the display area, a distance between the panel-side output terminals and the display area tends to become large. The control signal lines include the first control signal lines and the second control signal lines. The first control signal lines are routed from the panel-side output terminals toward the display area along the image signal lines so as to cross the long edge of the panel driver. The second control signal lines are routed from the panel-side output terminals so as to cross the short edge of the panel driver. Therefore, the distance between the panel-side output terminals and the display area, that is, the size of the non-display area is kept small. This configuration is advantageous for reducing an overall size and a frame size of the display device.

Because the second control signal lines are not arranged between the panel-side output terminals and the display area, a width of at least part of each second control signal line can be increased larger than that of the first control signal line without expanding the non-display area. Therefore, wire resistance of the second control line can be reduced while the size of the non-display area is kept small.

Preferable configurations regarding embodiments of the present invention will be described.

(1) The at least a portion of the second control signal line includes a portion between the panel-side output terminals and the short edge of the panel driver and a portion outside the short edge of the panel driver. The portion of the second control signal line routed from the panel-side output terminal outside the short edge of the panel driver is arranged in an area of the non-display area larger than an area thereof between the panel-side output terminals and the display area. Therefore, a width of the portion of the second control signal line can be increased, that is, a line resistance of the second control signal line can be reduced while the size of the non-display area is kept small.

(2) The display device further includes inspection lines connected to the control signal lines in the non-display area for inspecting continuity of the control signal lines. The inspection lines include first inspection lines and second inspection lines. The first inspection lines are connected to the panel-side output terminals that are connected to the first control signal lines. The second inspection lines are connected to portions of the second control signal lines closer to the display area than portions of the second control signal lines having a larger width. In this configuration, the first inspection lines are connected to the panel-side output terminals that are connected to the first control signal lines. Therefore, the first control signal lines having the smaller width can be inspected for continuity for an entire length of the first control signal lines. With this configuration, detectability of broken lines, if any, in the first control signal lines improves. Therefore, the liquid crystal display device including the broken first control signal line is less likely to be shipped. The second control signal lines routed from the panel-side control output terminals so as to cross the short edge of the panel driver. Therefore, it is difficult to directly connect the second inspection lines to the second panel-side control output terminals due to the limited space. The portions of the second control signal lines having the smaller width closer to the display area are more likely to break in comparison to the portions of the second control signal lines having the larger width. The second inspection lines are connected to the portions having the smaller width. With this configuration, detectability of broken lines, if any, in the portions having the smaller width improves. The portions of the second control signal lines having the larger width are less likely to break. Therefore, the liquid crystal display device including the broken second control signal line is less likely to be shipped even through an inspection using the second inspection lines is not performed.

(3) The first control signal lines are connected to the panel-side output terminals arranged adjacent to the panel-side output terminals that are connected to the image signal lines. The second control signal lines are connected to the panel-side output terminals arranged adjacent to the panel-side output terminals that ae connected to the first control signal lines away from the panel-side output terminals connected to the image signal lines. The first inspection lines are routed from the panel-side output terminals connected to the first control signal lines so as to cross the short edge of the panel driver along the second control signal lines. The first inspection lines connected to the panel-side control output terminals and the second control signal lines are routed so as not cross each other. In comparison to a configuration in which they cross each other, the routing is simple.

(4) The display device further includes first inspection terminals and second inspection terminals in the non-display area. The first inspection terminals are connected to ends of the first inspection lines away from ends thereof closer to the panel-side output terminals. The second inspection terminals are connected to ends of the second inspection lines away from ends thereof closer to the second control signal lines. The second inspection terminals are arranged adjacent to the first inspection terminals away from the panel-side output terminals. The first inspection terminals are arranged closer to the panel-side output terminals to which the first inspection lines are connected. The second inspection terminals are arranged closer to the second control signal lines to which the second inspection lines are connected. This configuration is advantageous for reducing lengths of the first inspection lines and the second inspection lines as much as possible.

(5) The display device further includes switching components, a row control circuit, and a column control circuit. The switching components are arranged in a matrix in the display area. The row control circuit is connected to ends of the control signal lines closer to the display area and configured to control inputs of the control signals to the switching components. The column control circuit is connected to ends of the image signal lines closer to the display area. The column control circuit is configured to control inputs of the image signals to the switching components. The inputs of the control signals from the control signal lines to the switching components arranged in the matrix in the display area are controlled by the row control circuit. Furthermore, the inputs of the image signals from the image signal lines to the switching components are controlled by the column control circuit. With this configuration, the switching components are properly driven and specified images are properly displayed in the display area.

(6) The second control signal lines include at least a clock control signal line and a power supply control signal line. The clock control signal line is configured to transmit clock signals, which are one kind of the control signals. The power supply control signal line is configured to transmit power supply control signals for driving at least one of the row control circuit and the column control circuit. Among the control signal lines, the clock control signal line is a kind of lines that is not expected to cause dull edges on a pulse waveform of the clock signals, which are control signals. The power supply control signal line is a kind of lines that is not expected to cause a voltage drop to stably drive the row control circuit and the column control circuit. With at least portions of the clock control signal line and the power source control signal line having the larger widths, the line resistances thereof can be reduced. As a result, the clock signals having a stable pulse waveform are supplied to the switching components. Furthermore, the row control circuit and the column control circuit are stably driven.

(7) At least one of the first control signal lines includes a zigzag portion at a middle section thereof. At least one of the row control circuit and the column control circuit includes an electro-static discharge (ESD) protection circuit electrically connected to the first control signal line including the zigzag portion. With the zigzag portion, a line resistance of the first control signal line is higher than a configuration without the zigzag portion. The first control signal line that includes the zigzag portion is electrically connected to at least one of the row control circuit and the column control circuit including the ESD protection circuit. Even if a surge is input to the first control signal line that includes the zigzag portion due to an electro-static discharge, the surge is passed to the ESD protection circuit. With this configuration the panel driver is protected from the surge.

(8) The switching components, the row control circuit, and the column control circuit include polycrystalline silicon thin films. In comparison to amorphous silicon thin films, the electron mobility of the polycrystalline silicon thin films is higher. This configuration is advantageous for improving definition and reducing power consumption.

(9) The first control signal lines are connected to the panel-side output terminals arranged adjacent to the panel-side output terminals that are connected to the image signal lines. The second control signal lines are connected to the panel-side output terminals arranged adjacent to the panel-side output terminals that are connected to the first control signal lines and away from the panel-side output terminals that are connected to the image signal lines. According to the configuration, lengths of portions of the second control signal lines, which are routed from the panel-side output terminals so as to cross the short edge of the panel driver, in an area that overlaps the panel driver are reduced. Therefore, mechanical interference is less likely to occur between the second control signal lines and the panel driver. Furthermore, circuits in the panel driver are less likely to be subjected to noise.

(10) The display panel further includes panel-side input terminals disposed parallel to the panel-side output terminals along the short edge of the panel driver in the non-display area. The panel-side input terminals are connected to the panel driver. The second control signal lines are routed in an area between the panel-side output terminals and the panel-side input terminals. Input signals from an external signal source are transmitted to the panel driver via the panel-side output terminals. The second control signal lines are arranged in the area between the panel-side output terminals and the panel-side input terminals that are arranged parallel to each other and along a direction parallel to the short edge of the panel driver. The second control signal lines is routed so as to cross the short edge of the panel driver.

(11) The display panel is a liquid crystal display panel including a pair of substrate and liquid crystals sealed between the substrates. Applications of such a display device include electronic devices including personal digital assistances, mobile phones, notebook computers, and portable video game players.

(12) The display device further includes a lighting device arranged opposite the liquid crystal panel and away from a display surface of the liquid crystal panel. The lighting device is configured to provide the liquid crystal panel with light. Images are displayed in the display area of the liquid crystal panel with the light provided by the lighting device.

Advantageous Effect of the Invention

According to the present invention, the size of the non-display area is kept small.

MODE FOR CARRYING OUT THE INVENTION

First Embodiment

Figure 1:
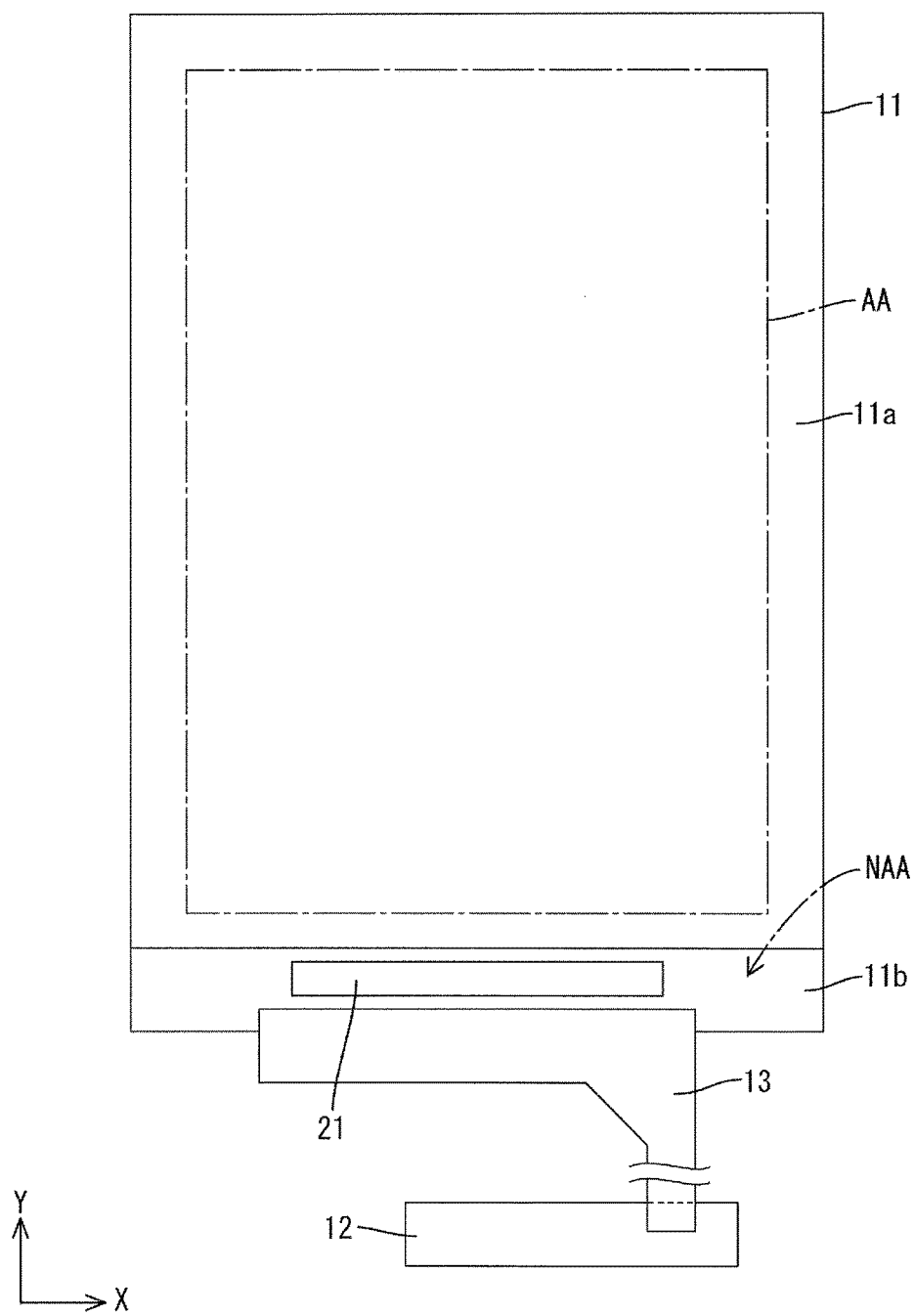
FIG. 1 is a schematic plan view illustrating connection among a flexible circuit board, a control circuit board, and a liquid crystal panel including a driver according to a first embodiment of the present invention.

A first embodiment will be described with reference to FIGS. 1 through 6. A liquid crystal display device 10 according to this embodiment will be described. X-axis, Y-axis and Z-axis are indicated in the drawings. The axes in each drawing correspond to the respective axes in other drawings. The vertical direction in FIG. 2 is defined as a reference. The upper side and the lower side in FIG. 2 correspond to the front side and the rear side, respectively.

Figure 2:
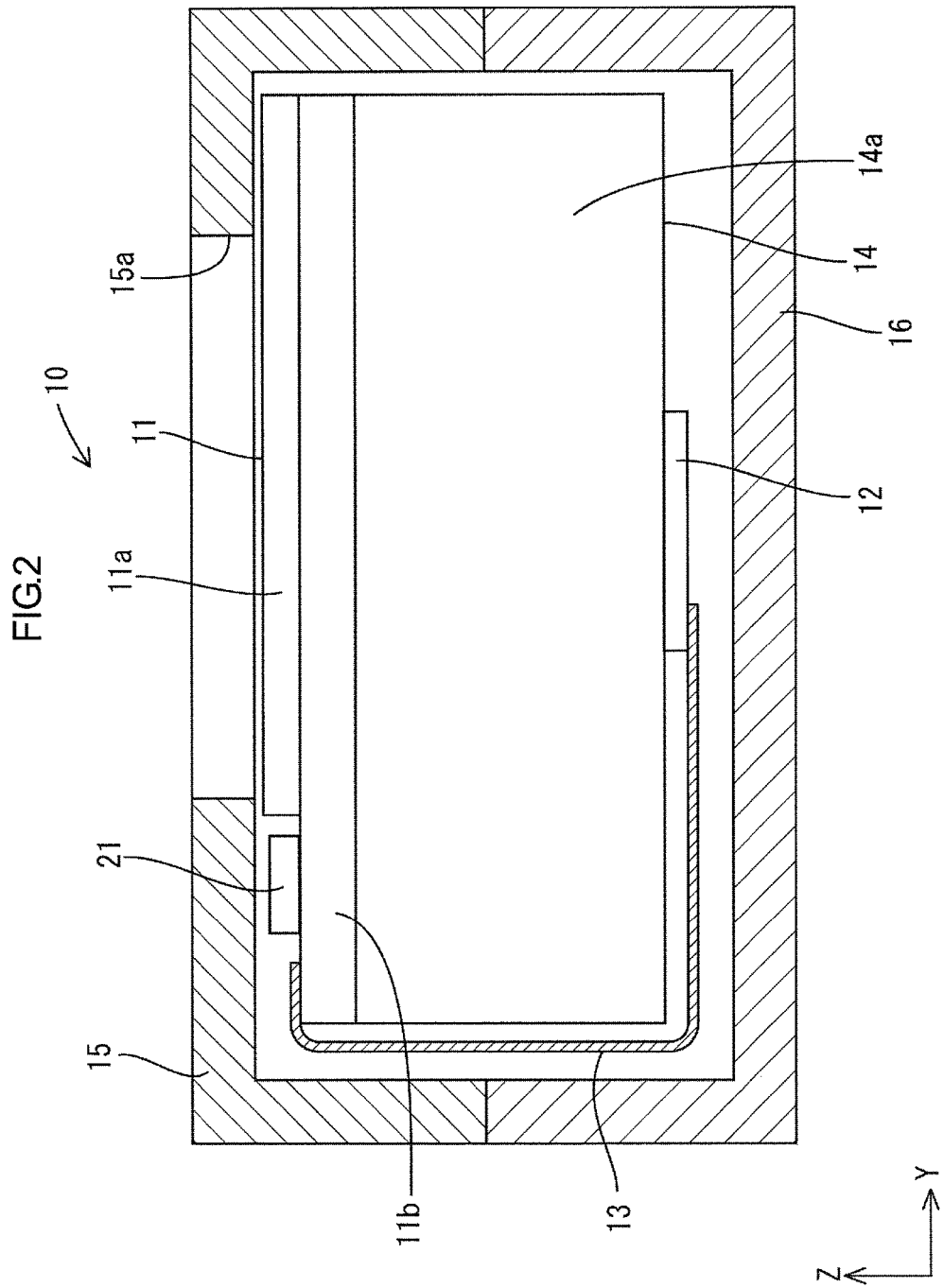
FIG. 2 is a schematic cross-sectional view of a liquid crystal display device along a longitudinal direction.

As illustrated in FIGS. 1 and 2, the liquid crystal display device 10 includes a liquid crystal panel (a display panel, a display component) 11, a driver (a panel driver) 21, a control circuit board (an external signal source) 12, a flexible circuit board (an external device connecting member) 13, and a backlight unit (a lighting unit) 14. The liquid crystal panel 11 includes a display area AA configured to display images and a non-display area NAA outside the display area AA. The driver 21 is configured to drive the liquid crystal display panel 11. The control circuit board 12 is configured to supply various input signals to the driver 21 from the outside. The flexible circuit board 13 electrically connects the liquid crystal panel 11 to the external control circuit board 12. The backlight unit 14 is an external light source configured to provide the liquid crystal panel 11 with light. The liquid crystal panel 10 further includes exterior trim components 15, 16 for covering and holding the liquid crystal panel 11 and the backlight unit 14 that are mounted together. The exterior trim components 15, 16 are a pair of front and rear components. The front exterior trim component 15 includes avoid portion 15a through which images on the display area AA of the liquid crystal panel 11 are viewed from the outside. The liquid crystal display device 10 according to this embodiment is for various electronic devices (not illustrated) including portable information terminals (including electronic book readers and PDAs), mobile phones (including smartphones), notebook computers (including tablet computers), digital photo frames, portable video game players, and electronic papers. The display size of the liquid crystal panel 11 of the liquid crystal display device 10 is from several inches to a dozen inches. Namely, the liquid crystal panel 11 is generally classified as a small sized or a medium sized panel.

First, the backlight unit 14 will be described. As illustrated in FIG. 2, the backlight unit 14 includes a chassis 14a, alight source, which is not illustrated, and an optical member, which are not illustrated. The chassis 14a has a box-like shape with an opening on the front side (the liquid crystal panel 11 side). The light source (e.g., cold cathode ray tubes, LEDs, organic ELs) is arranged inside the chassis 14a. The optical member is arranged so as to cover the opening of the chassis 14a. The optical member has a function for converting light from the light source into planar light.

Next, the liquid crystal panel 11 will be described. As illustrated in FIG. 1, the liquid crystal panel 11 has a vertically elongated (or rectangular) overall shape. The display area (active area) AA is offset toward a first edge of the long dimension of the liquid crystal panel 11 (the upper edge in FIG. 1). The driver 21 and the flexible circuit board 13 are mounted to a portion of the liquid crystal panel 11 closer to a second edge of the ling dimension thereof (the lower edge in FIG. 1). An area of the liquid crystal panel 11 outside the display area AA is the non-display area (non-active area) NAA in which images area not displayed. The non-display area NAA includes a frame-like section around the display area AA (corresponding to a frame area of a CF board 11a, which will be described later) and a section closer to the second edge of the long dimension (an exposed area of the array board 11b not overlapping the CF board 11a). The section closer to the second edge of the long dimension includes a mounting section for the driver 21 and the flexible circuit board 13. The short-side direction of the liquid crystal panel 11 corresponds with the X-axis direction in the drawings. The short-side direction of the liquid crystal panel 11 corresponds with the Y-axis direction in the drawings. In FIG. 1, one-dash chain lines indicate an outline of the display area AA slightly smaller than the CF board 11a. An area outer than a solid line is the non-display area NAA.

Figure 3:
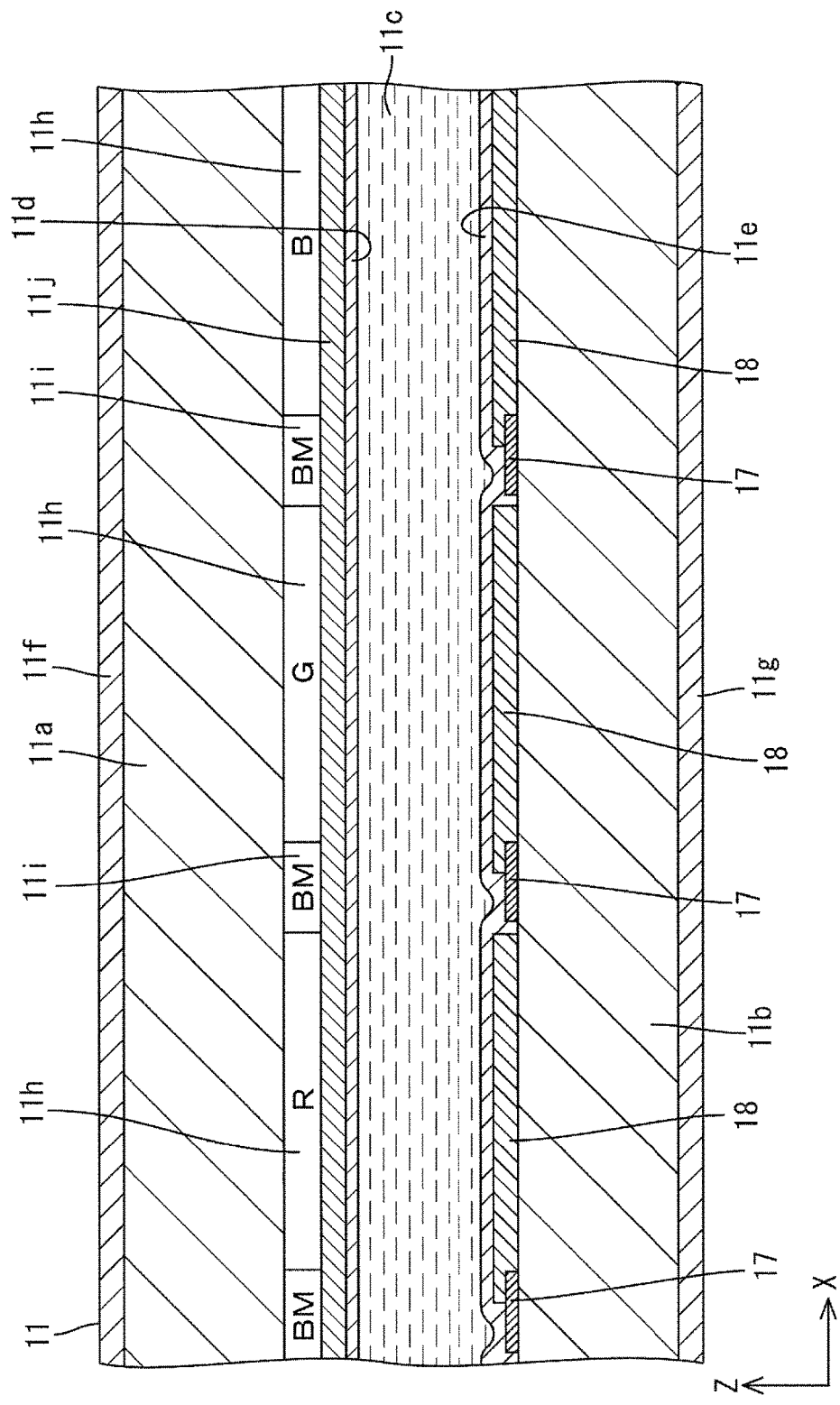
FIG. 3 is a schematic cross-sectional view of the liquid crystal panel.

As illustrated in FIG. 3, the liquid crystal panel 11 includes a pair of transparent (with light transmissivity) glass substrates 11a, 11b and a liquid crystal layer 11c. The liquid crystal layer 11c is between the substrates 11a, 11b. The liquid crystal layer 11c contains liquid crystal molecules, which are substances that change optical characteristics when electromagnetic field is applied. The substrates 11a, 11b are bonded together with a sealant, which is not illustrated, while a gap equal to the thickness of the liquid crystal layer 11c is maintained. One of the substrates 11a, 11b on the front side is the CF board 11a and one on the rear side is the array board 11b. As illustrated in FIGS. 1 and 2, the CF board 11a has a short dimension substantially equal to that of the array board 11b and a long dimension smaller than that of the array board 11b. The CF board 11a is bonded to the array board 11b with a first edge of the long dimension (the upper edge in FIG. 1) aligned with that of the array board 11b. Therefore, the CF board 11a does not overlap a predefined area of the array board 11b closer to a second edge thereof (the lower edge in FIG. 1), that is, front and back surfaces are exposed to the outside. The mounting section for the driver 21 and the flexible circuit board 13 (arrangement section for terminals 22 to 24) is provided in this area. Alignment films 11d, 11e are formed on inner surfaces of the substrates 11a, 11b, respectively. The alignment films 11d, 11e are for aligning the liquid crystal molecules in the liquid crystal layer 11c. Polarizing plates 11f, 11g are attached to outer surfaces of the substrates 11a, 11b, respectively.

Figure 4:
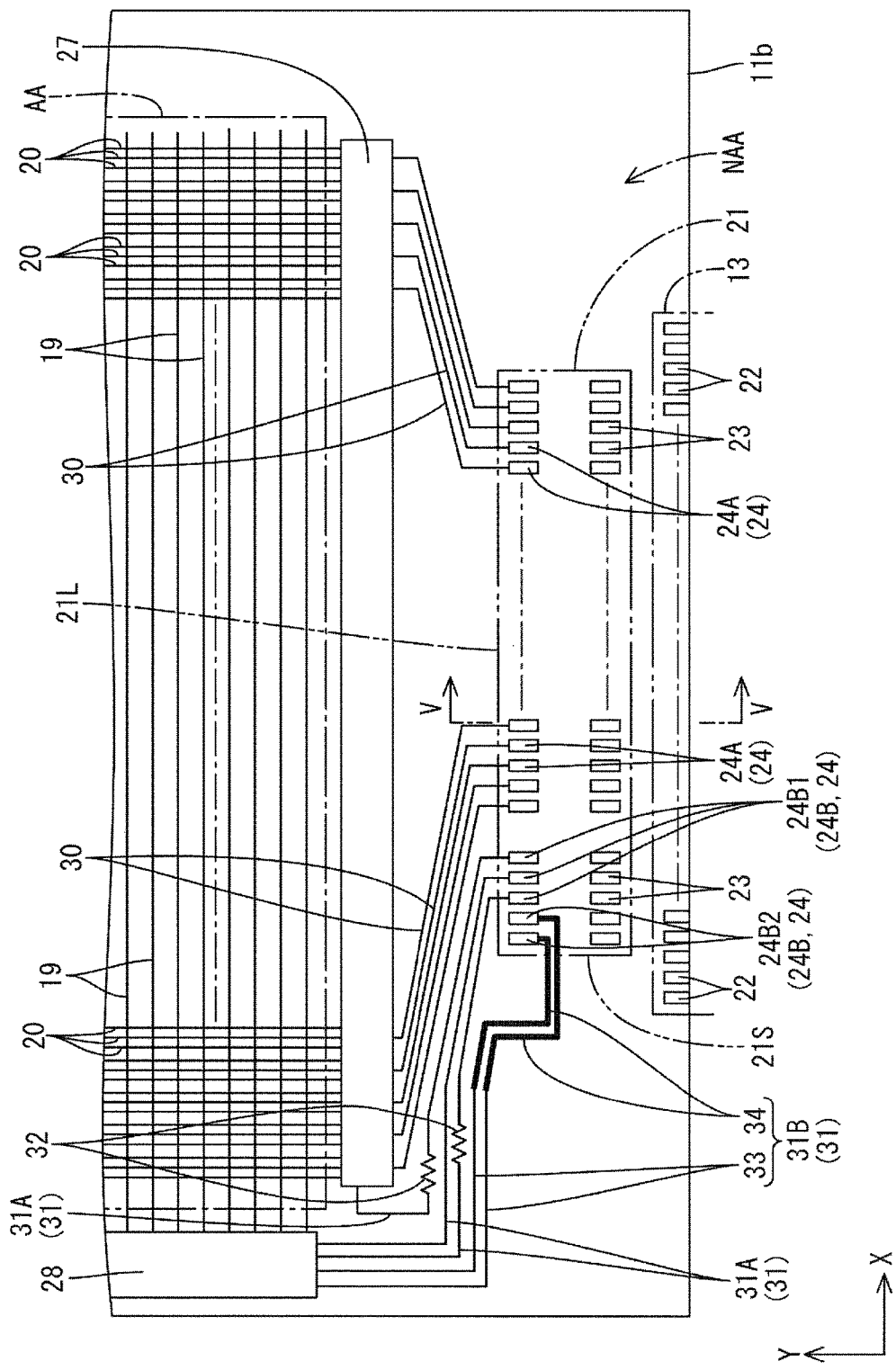
FIG. 4 is a plan view of an end portion of an array board in which the driver and the flexible circuit board are mounted illustrating routing of traces.

Next, configurations of the array board 11b and the CF board 11a inside the display area AA will be described in detail in sequence. As illustrated in FIGS. 3 and 4, a number of thin film transistors (TFTs) 17 and a number of pixel electrodes 18 are arranged in a matrix on the inner surface of the array board 11b (a surface opposite the liquid crystal layer 11C and the CF board 11a). The TFTs 17 are switching components. Gate lines (row control lines, scanning lines) 19 and source lines (column control lines, data lines) are arranged in a matrix around the TFTs 17 and the pixel electrodes 18. Namely, each TFT 17 and each pixel electrodes 18 are arranged at an intersection of corresponding ones of the gate lines 19 and the source lines 20 that are arranged in a matrix. The TFT 17 and the pixel electrodes 18 are arranged in a matrix such that they are parallel to each other. The gate lines 19 and the source lines 20 are made of metal material (conducting material). Insulation films are arranged between the gate lines 19 and the source lines 20 at intersections thereof. The gate lines 19 and the source lines 20 are connected to gate electrodes and source electrodes of the TFTs 17, respectively. The pixel electrodes 18 are connected to drain electrodes. Each TFT 17 includes a semiconductor film that can carry electrons between the source electrode and the drain electrode. The semiconductor film is a continuous grain (CG) silicon thin film, which is a kind of polycrystalline silicon thin films. The CG silicon thin film is prepared by adding a metal material to an amorphous silicon thin film and thermally processing it at a low temperature lower equal to 550° C. or lower for a short period. Therefore, atomic arrangement of silicon crystals at a crystal grain boundary has continuity. Electron mobility of the CG silicon thin film is about 200 to 300 $cm^2$, which is higher than the amorphous silicon thin film. Therefore, the TFT 17 can be easily reduced in size and an amount of transmitting light of the pixel electrode 18 can be maximized. This configuration is preferable for improving the definition and reducing power consumption. In the TFT 17 including such a semiconductor film, the semiconductor film is arranged at the bottom layer and the gate electrode is layered, that is, in an upper layer via an insulating film. Namely, the TFT 17 is a staggered type (a coplanar-type). The pixel electrode 18 has a portrait shape (a rectangular shape) in a plan view. The pixel electrode 18 is made of transparent electrode material such as indium tin oxide (ITO) and zinc oxide (ZnO). Capacitance lines may be arranged on the array board 11b parallel to the gate lines 19, crossing the pixel electrodes 18, and overlapping via an insulating layer (not illustrated).

As illustrated in FIG. 3, a number of color filters 11h including color sections such as red (R), green (G), and blue (B) color sections are arranged in a matrix on the CF board 11a. The color filters 11h are arranged parallel to each other so as to overlap the pixel electrodes 18 on the array board 11b in a plan view. A light blocking layer (a black matrix) 11i is formed in spaces between the color sections of the color filters 11h. The light blocking layer has a grid-like shape and has a function for reducing color mixing. The light blocking layer 11i is disposed over the gate lines 19 and the source lines 20 in a plan view. Counter electrodes 11j are formed on surfaces of the color filters 11h and the light blocking layer 11i. The counter electrodes 11j are solid traces opposite the pixel electrodes 18 on the array board 11b. In the liquid crystal panel 11, the R (red), the G (green), and the B (blue) color sections and three pixel electrodes 18 opposite those color sections form one pixel, which is a unit of display. The pixel includes a red pixel including the R color section, a green pixel including the G color section, and a blue pixel including the B color section. The color pixels are arranged on a plate surface of the liquid crystal panel 11 in repeating sequence along the rows (the X-axis direction). This forms a number of groups of pixels arranged along the columns (the Y-axis direction).

As illustrated in FIGS. 1 and 2, the control circuit board 12 is mounted to the rear surface (an outer surface on an opposite side from the liquid crystal panel 11) of the chassis 14a of the backlight unit 14 with screws. The control circuit board 12 includes electronic components for providing the driver 21 with various input signals. The electronic components are mounted on a phenolic paper or a glass-epoxy resin substrate on which traces (electrically-conducting paths) are formed in predetermined patterns (not illustrated). A first end (one of ends) of the flexible printed circuit board 13 is electrically and mechanically connected to the control circuit board 12 via an anisotropic conductive film (ACF).

As illustrated in FIG. 2, the flexible circuit board (an FPC board) 13 includes a base member made of synthetic resin (e.g., polyimide resin) having insulating properties and flexibility. A number of traces are formed on the base member (not illustrated). The first end of the long dimension of the flexible circuit board 13 is connected to the control circuit board 12 disposed on the rear surface of the chassis 14a as described earlier. A second end (another end) is connected to the array board 11b of the liquid crystal panel 11. In the liquid crystal display device 10, the flexible circuit board 13 is folded in U-like shape in a cross-sectional view. At ends of the long dimension of the flexible circuit board 13, the traces are exposed to the outside to form terminal portions (not illustrated). The terminal portions are electrically connected to the control circuit board 12 and the array board 11b, respectively. With this configuration, the input signals are transmitted from the control circuit board 12 to the liquid crystal panel 11.

As illustrated in FIG. 1, the driver 21 is an LSI chip including a driver circuit therein. The driver 21 is configured to operate based on signals from the control circuit board 12, which is a signal source, to generate output signals from the input signals from the control circuit board 12, and to send the output signals to the display area AA of the liquid crystal panel 11. The driver 21 has a landscape rectangular shape in a plan view (a longitudinal shape along the short edge of the liquid crystal panel 11). The driver 21 is directly mounted on the array board 11b of the liquid crystal panel 11 in the non-display area NAA, that is, through a chip on glass (COG) mount method. The long-side direction of the driver 21 corresponds with the X-axis direction (the short-side direction of the liquid crystal panel 11) and the short-side direction thereof corresponds with the Y-axis direction (the long-side direction of the liquid crystal panel 11).

Next, a connecting structure of the flexible circuit board 13 and the driver 21 in the non-display area NAA of the array board 11b will be described. The non-display area NAA of the array board 11b includes a non-overlapping area that does not overlap the CF board 11a. In the non-overlapping area, the driver 21 and the flexible circuit board 13 are mounted as illustrated in FIG. 1. An end of the flexible circuit board 13 is arranged at a short edge portion of the array board 11b and the driver 21 is arranged closer to the display area AA than the flexible circuit board 13 on the array board 11b. Namely, the driver 21 is arranged between the display area AA and the flexible circuit board 13 in the non-display area NAA and the flexible circuit board 13 is arranged such that the end thereof (the portion mounted to the liquid crystal panel 11) is farther from the display area AA than the driver 21. The end of the flexible circuit board 13 is mounted at the middle of the short dimension of the array board 11b such that an edge of the mounted end extends along the short side of the array board 11b (along the short-side direction or the X-axis direction). The length of the edge of the flexible circuit board 13 mounted to the array board 11b is smaller than the length of the array board 11b. The driver 21 is mounted at the middle of the short dimension of the array board 11b in the non-display area NAA with the long-side direction thereof aligned with the short-side direction of the array board 11b (the X-axis direction).

Figure 6:
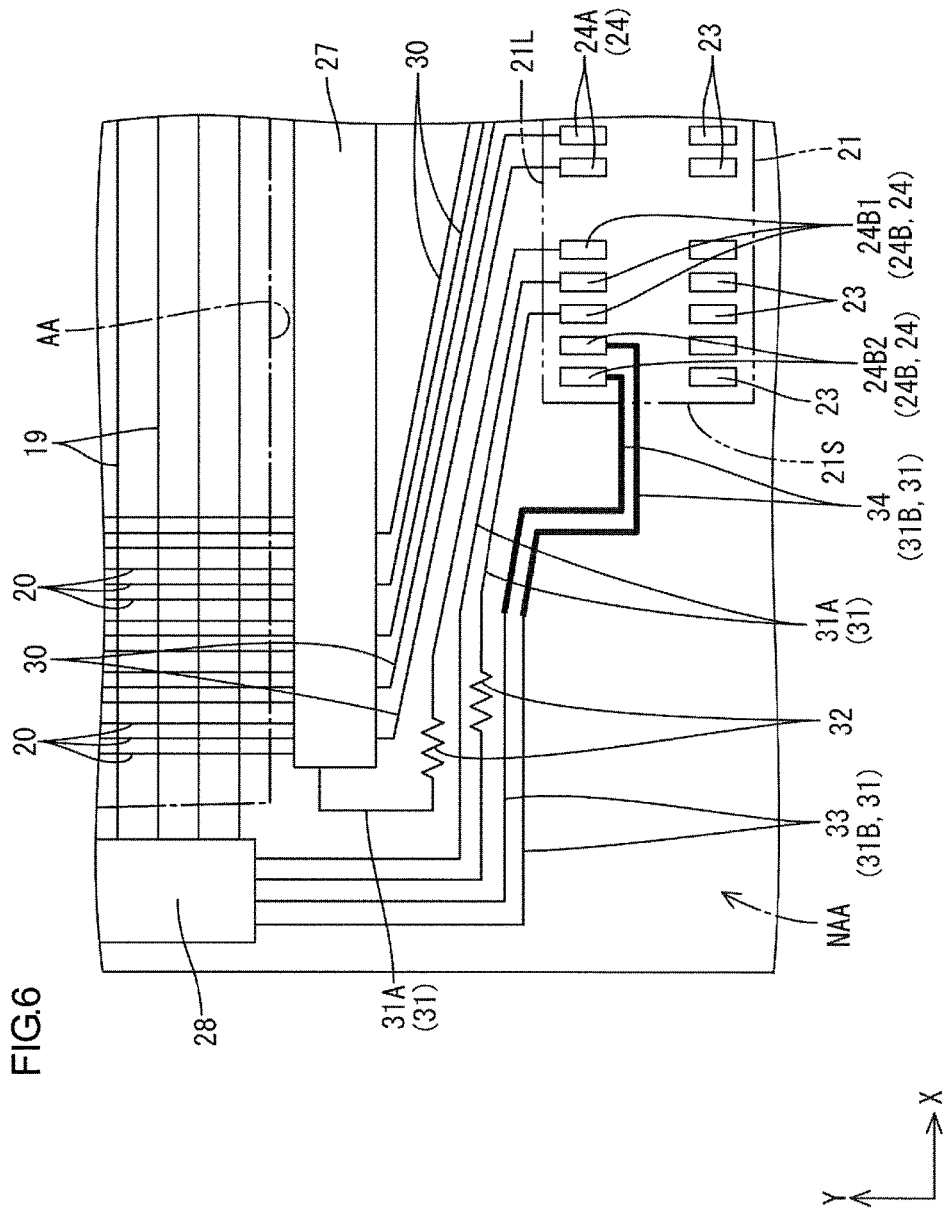
FIG. 6 is a plan view illustrating arrangement of control signal lines and panel-side output terminals.

As illustrated in FIG. 4, in the mounting area of the array board 11b in which the flexible circuit board 13 is mounted (an external component mounting area), external connection terminals 22 are arranged for receiving input signals from the flexible circuit board 13. In the mounting area of the array board 11b in which the driver 21 is mounted (a panel driver mounting area), panel-side input terminals 23 and panel-side output terminals 24 are arranged. The panel-side input terminals 23 are for inputting input signals to the driver 21 and the panel-side output terminals 24 are for receiving output signals from the driver 21. In the non-display area NAA, relay traces are routed (not illustrated) so as to cross a space between the mounting area in which the flexible circuit board 13 is mounted and the mounting area in which the driver 21 is mounted. The external connection terminals 22 and the panel-side input terminals 23 are electrically connected via the relay traces. The driver 21 includes driver-side input terminals (a panel-driving-side input terminal) 25 and driver-side output terminals (a panel-driving-side output terminal) 26. The driver-side input terminals 25 are electrically connected to the panel-side input terminals 23. The driver-side output terminals 26 are electrically connected to the panel-side output terminals 24. In FIG. 4, the flexible circuit board 13 and the driver 21 are indicated by two-dashed chain lines. In FIGS. 4 and 6, one-dashed chain lines indicate the outer boundary of the display area AA inside a column control circuit 27 and a row control circuit 28, which will be described later. The area outside one-dashed chain lines is the non-display area NAA.

Figure 5:
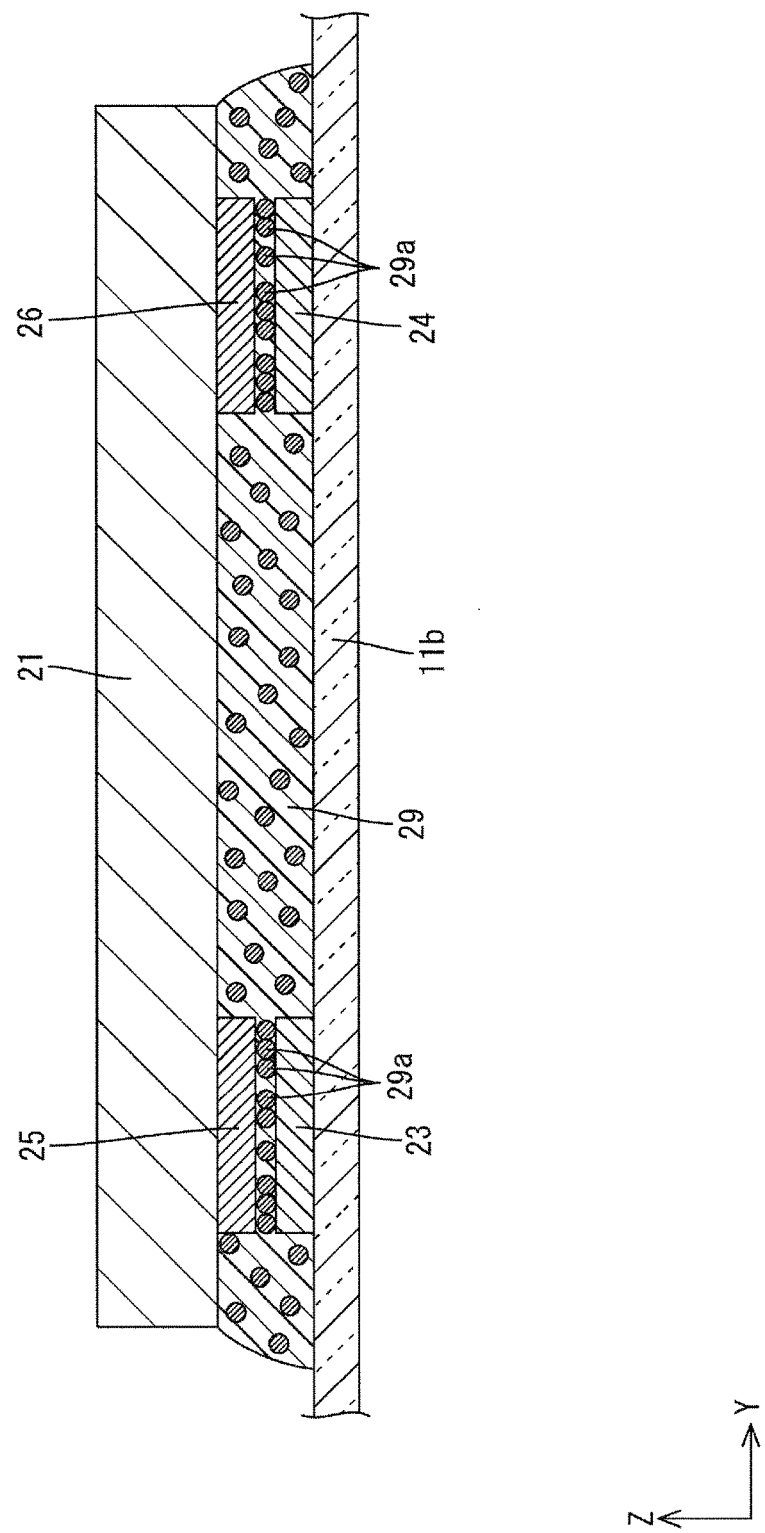
FIG. 5 is a cross-sectional view of FIG. 4 along line v-v.

The panel-side input terminals 23 and the panel-side output terminals 24 include thin films that are made of the same metal material as that of the gate lines 19 or the source lines 20. As illustrated in FIG. 5, the surfaces of the thin films are covered with transparent electrode material that is the same as that of the pixel electrodes 18 such as ITO and ZnO. In the production process of the liquid crystal panel 11 (the array board 11b), patterning of the panel-side input terminals 23 and the panel-side output terminals 24 is performed during patterning of the gate lines 19, the source lines 20, or the pixel electrodes 18 using a known photolithography method. Anisotropic conductive films (ACF) 29 are applied to the surfaces of the panel-side input terminals 23 and the panel-side output terminals 24. The driver-side input terminals 25 and the driver-side output terminals 26 of the driver 21 are electrically connected to the panel-side input terminals 23 and the panel-side output terminals 24, respectively, via conducting particles 29a contained in the anisotropic conductive films 29. Although not illustrated in the drawings, the external connection terminals 22 have the same cross-sectional structure as the panel-side input terminals 23 and the panel-side output terminals 24. The external connection terminals 22 are electrically connected to the terminal portion of the flexible circuit board 13 via the anisotropic conductive film.

As illustrated in FIG. 4, the panel-side input terminals 23 and the panel-side output terminals 24 are arranged in an area of the array board 11b where the driver 12 overlaps in a plan view, that is, the mounting area of the array board 11b. The panel-side input terminals 23 and the panel-side output terminals 24 are arranged along the Y-axis direction (an arrangement direction in which the driver 21 and the display area AA are arranged) with a predetermined gap therebetween. The panel-side input terminals 23 are arranged closer to the flexible circuit board 13 (away from the display area AA) in the mounting area of the driver 21 of the array board 11b. The panel-side output terminals 24 area arranged closer to the display area AA (away from the flexible circuit board 13). Groups of the panel-side input terminals 23 and the panel-side output terminals 24 are linearly arranged at predetermined intervals along the X-axis direction, that is, the long-side direction of the driver 21. The panel-side output terminals 24 include panel-side image output terminals 24A and the panel-side control output terminals 24B. The panel-side output terminals 24 are for receiving image signals (data signals, video signals) in output signals from the driver 21. The panel-side control output terminals 24B are for receiving control signals in the output signals. A plurality of the panel-side image output terminals 24A in the panel-side output terminals 24 are arranged from the right edge toward left in FIG. 4 along the X-axis direction. The panel-side image output terminals 24A account for a large part (a large number) of the panel-side output terminals 24. Five panel-side control output terminals 24B are arranged from the left edge toward right in FIG. 4 along the X-axis direction. The panel-side control output terminals 24B account for only a part (a small number) of the panel-side output terminals 24. In the following description, the panel-side image output terminals of the panel-side output terminals 24 will be indicated by the reference numeral with the suffix A and the panel-side control output terminals will be indicated by the reference numeral with the suffix B when they need to be distinguished from each other. When the panel-side image output terminals and the panel-side control output terminals do not need to be distinguished from each other, the suffixes will not be added.

The driver-side input terminals 25 and the driver-side output terminals 26 are made of metal having high conductivity such as gold. As illustrated in FIG. 5, each of the driver-side input terminals 25 and the driver-side output terminals 26 has a bump-like shape that protrudes from the bottom surface of the driver 21 (the surface opposite the array board 11b). The driver-side input terminals 25 and the driver-side output terminals 26 are connected to a processing circuit in the driver 21. Input signals from the driver-side input terminals 25 are processed by the processing circuit and the processed signals are output from the driver-side output terminals 26. The driver-side input terminals 25 and the driver-side output terminals 26 are arranged along the X-axis direction similar to the panel-side input terminals 23 and the panel-side output terminals 24. Namely, groups of the driver-side input terminals 25 and the driver-side output terminals 26 are linearly arranged at predetermined intervals along the long-side direction of the driver 21.

As illustrated in FIG. 4, in portions of the non-display area NAA of the array board 11b adjacent to the short side and the long side of the display area AA, respectively, the column control circuit 27 and the row control circuit 28 are disposed. The column control circuit 27 and the row control circuit 28 are connected to the gate lines 19 and the source lines 20 for transmitting output signals from the driver 21 to the TFTs 17. Each of the column control circuit 27 and the row control circuit 28 includes a control circuit for controlling transmission of the output signals to the TFTs 17. The control circuit is monolithically fabricated on the array board 11b with a CG silicon thin film, which is also used in TFTs 17, as a base. In the production process of the liquid crystal panel 11 (the array board 11b), patterning of the column control circuit 27 and the row control circuit 28 is performed on the array board 11b during patterning of the TFTs 17 using a known photolithography method.

As illustrated in FIG. 4, the column control circuit 27 is arranged adjacent to the short side of the display area AA on the lower side in FIG. 4. Namely, the column control circuit 27 is arranged in a landscape rectangular area that extends in the X-axis direction between the display area AA and the driver 21 with respect to the Y-axis direction. The column control circuit 27 is connected to the source lines 20 arranged in the display area AA. The column control circuit 27 includes a switch circuit (an RGB switch circuit) for distributing the image signals in the output signals from the driver to the source lines 20, respectively. Specifically, multiple numbers of the source lines 20 are arranged parallel to each other in the X-axis direction in the display area AA of the array board 11b and connected to the respective TFTs 17 configured as R (red), G (green), and B (blue) pixels. The column control circuit 27 distributes the image signals from the driver 21 to the R, G, and B source lines 20 using the switch circuit. The column control circuit 27 includes auxiliary circuits including a level shifter circuit and an electrostatic discharge (ESD) protection circuit.

As illustrated in FIG. 4, the row control circuit 28 is arranged adjacent to the long edge of the display area AA on the left side in FIG. 4. Namely, the row control circuit 28 is arranged in a portrait rectangular area that extends in the Y-axis direction. The row control circuit 28 is connected to the gate lines 19 arrange in the display area AA. The row control circuit 28 includes a scan circuit for sending control signals in the output signals from the driver 21 to the gate lines 19 at predetermined timing and scanning the gate lines 19 in sequence. Specifically, multiple numbers of the gate lines 19 are arranged parallel to each other in the Y-axis direction in the display area AA of the array board 11b. The scan circuit of the row control circuit 28 is configured to send control signals (scan signals) from the driver 21 to the gate lines 19 in sequence from the uppermost one in FIG. 4 to the lowermost one to scan the gate lines 19. The row control circuit 28 includes auxiliary circuits including a level shifter circuit, a buffer circuit, and an ESD protection circuit.

As illustrated in FIG. 4, in the non-display area NAA of the array board 11b, image signal lines 30 and control signal lines 31 are arranged. The image signal lines 30 connect the panel-side image output terminals 24A, which are connected to the driver 21, to the column control circuit 27 to transmit image signals. The control signal lines 31 connect the panel-side control output terminals 24B, which are connected to the driver 21, to the row control circuit 28 to transmit control signals. The image signal lines 30 and the control signal lines 31 are made of the same metal material as the gate lines 19 and the source lines 20. In the production process of the liquid crystal panel 11 (the array board 11b), patterning of the image signal lines 30 and the control signal lines 31 is performed on the array board 11b during patterning of the gate lines 19 or the source lines 20 using a known photolithography method.

As illustrated in FIG. 4, one of ends of each image signal line 30 (closer to the display area AA) is connected to the long edge of the column control circuit 27. The other end of each image signal line 30 (away from the display area AA) is connected to the corresponding panel-side image output terminal 24A. The image signal lines 30 are routed so as to cross an area between the column control circuit 27 and the panel-side image output terminals 24A in the non-display area NAA of the array board 11b. A number of the image signal lines 30 are arranged in the X-axis direction and connected to the respective panel-side image output terminals 24A that are arranged in the X-axis direction. An X-dimension of an area in which the column control circuit 27, to which the image signal lines 30 are connected, is larger than that of an area in which the panel-side image output terminals 24A are disposed when they are compared. This is because the number of the source lines 20 connected to the column control circuit 27 is larger than the number of the image signal lines 30 (about three times larger). The image signal lines 30 connected to the panel-side image output terminals 24A spread in a fan-like form when they are routed from the panel-side image output terminals 24A to the column control circuit 27. Specifically, the image signal lines 30 are routed from the panel-side image output terminals 24A in the Y-axis direction, that is, a direction perpendicular to the long-side direction of the driver 21 toward the column control circuit 27 (toward the display area AA). The image signal lines 30 are bent at an angle relative to the X-axis direction and the Y-axis direction and spread outward in the X-axis direction (the long-side direction of the driver 21). The image signal lines 30 are routed to the long edge of the column control circuit 27. Namely, the image signal lines 30 are routed from the panel-side image output terminals 24A to the column control circuit 27 so as to cross the long edge 21L of the driver 21 and spread in a fan-like form. The image signal lines 30 on the left in FIG. 4 among the image signal lines 30 are angled in the counterclockwise direction and the image signal lines 30 on the right in FIG. 4 are angled in the clockwise direction.

As illustrated in FIG. 4, one of the control signal lines 31 includes one of ends (closer to the display area AA) connected to the short edge of the column control circuit 27 adjacent to the row control circuit 28 and the other end (away from the display area AA) connected to the panel-side control output terminal 24B. Four of the control signal lines 31 each includes one of ends connected to the short edge of the row control circuit 28 closer to the column control circuit 27 and the other end connected to the panel-side control output terminal 24B. The control signals transmitted by the control signal line 31 including the end connected to the column control circuit 27 include driving voltage signals for driving the column control circuit 27. The control signals transmitted by the control signals lines 31 including the ends connected to the row control circuit 28 include scan signals, clock signals, power supply voltage signals, initial signals, start pulses, scanning-direction switching signals, and driving signals for driving the row control circuit 28.

As illustrated in FIG. 6, the control signal lines 31 include first control signal lines 31A and second control signal lines 31B. The first control signal lines 31A are routed from the panel-side control output terminals 24B toward the display area AA so as to cross the long edge 21L of the driver 21 and extend along the image signal line 30. The second control signal lines 31B are routed from the panel-side control output terminals 24B toward the display area AA so as to cross the short edge 21S of the driver 21. In the following description, the first control signal lines of the control signal lines 31 will be indicated by the reference numeral with the suffix A and the second control signal lines will be indicated by the reference numeral with the suffix B when they need to be distinguished from each other. When the first control signal lines and the second control signal lines do not need to be distinguished from each other, the suffixes will not be added. Furthermore, in the following description, the panel-side control output terminals 24B to which the first control signal lines 31A are connected among the panel-side control output terminals 24B are indicated as the first panel-side control output terminals 24B1. The panel-side control output terminals 24B to which the second control signal lines 31B are connected are indicated as the second panel-side control output terminals 24B2. When the first panel-side control output terminals and the second panel-side control output terminals are distinguished from each other, the first panel-side control output terminals will be indicated by the reference numeral with the suffix "1" and the second panel-side control output terminals will be indicated by the reference numeral with the suffix "2." When the first panel-side control output terminals and the second panel-side control output terminals do not need to be distinguished from each other, the suffixes will not be added.

As illustrated in FIG. 4, the first panel-side control output terminals 24B1 connected to the first control signal lines 31A are arranged adjacent to the panel-side image output terminals 24A among the panel-side output terminals 24. Three first control signal lines 31A and three first panel-side control output terminals 24B1 are arranged in the X-axis direction. As illustrated in FIG. 6, the first control signal lines 31A are routed from the first panel-side control output terminals 24B1 in the Y-axis direction, that is, a direction perpendicular to the long-side direction of the driver 21, toward the column control circuit 27 (toward the display area AA). The first control signal lines 31A are bent at an angle relative to the X-axis direction and the Y-axis direction and spread outward in the X-axis direction (the long-side direction of the driver 21). The first control signal lines 31A are routed from the first panel-side control output terminals 24B1 to the column control circuit 27 or the row control circuit 28. Namely, the first control signal lines 31A are routed in substantially parallel to the image signal line 30 adjacently arranged in the X-axis direction in some portions so as not to cross the image signal line 30. The first control signal lines 31A spread in a fan-like form. A width of each first control signal line 31A is substantially constant for an entire length thereof.

As illustrated in FIG. 6, the first control signal lines 31A include one that includes an end connected to the column control circuit 27 and ones (two of them) that include ends connected to the row control circuit 28. The first control signal line 31A connected to the column control circuit 27 includes an angled portion that is angled relative to the X-axis direction and the Y-axis direction. The angled portion extends parallel to the image signal line 30 for a predetermined distance. The first control signal line 31A then bends and extends outward in the X-axis direction. The first control signal line 31A then bends twice substantially at a right angle and reaches the column control circuit 27.

As illustrated in FIG. 6, the first control signal line 31A connected to the column control circuit 27 and one of the two first control signal lines 31A connected to the row control circuit 28 include zigzag portions 32 formed by winding portions of the first control signal lines 31A extending in the X-axis direction. Each zigzag portion has a zigzag plan-view shape. In comparison to the first control signal lines 31A that do not include the zigzag portions, the first control signal lines 31A that include the zigzag portions have higher resistance. The first control signal lines 31A including the zigzag portions include one that is connected to the column control circuit 27 and one that is connected to the row control circuit 28. The column control circuit 27 and the row control circuit 28 include the ESD protection circuits, respectively. Therefore, even if the first control signal lines 31A that include the zigzag portions 32 receive surges due to ESD, the surges are absorbed by the ESD circuits. With this configuration, the driver 21 is protected from surges.

As illustrated in FIG. 4, the second panel-side control output terminals 24B2 connected to the second control signal lines 31B among the panel-side output terminals 24 are arranged adjacent to the first panel-side control output terminals 24B1 and away from the panel-side image output terminals 24A (i.e., at an end of the panel-side output terminals 24). Namely, the second panel-side control output terminals 24B2 are arranged closer to the row control circuit 28 then other panel-side output terminals 24. Two second control signal lines 31B and two second panel-side control output terminals 24B2 are arranged in the X-axis direction. As illustrated in FIG. 6, the second control signal lines 31B extend from the second panel-side control output terminals 24B2 in the Y-axis direction, that is, the direction perpendicular to the long-side direction of the driver 21 toward a side opposite to the column control circuit 27 (or the display area AA). The second control signal lines 31B then bend at a substantially right angle before reaching the panel-side input terminals 23 and extend in the X-axis direction out of the mounting area in which the driver 21 is mounted after crossing the short edge 21S of the driver 21. The direction in which the second control lines 31B extend from the second panel-side control output terminals 24B2 is 180 degrees apposite from the direction in which the image signal lines 30 and the first control signal lines 31A extend from the panel-side image output terminals 24A and the first panel-side control output terminals 24B1, respectively. The second control signal lines 31B extend in the mounting area in which the driver 21 is mounted between the second panel-side control output terminals 24B2 and the panel-side input terminals 23 and cross the short edge 21S of the driver 21. Unlike the image signal lines 30 or the first control signal lines 31A described earlier, the second control signal lines 31B are not arranged in the area between the driver 21 and the column control circuit 27 (or the display area AA). In comparison to a configuration in which all control signal lines are routed similar to the image signal lines 30, the distance between the driver 21 and the column control circuit 27 because the second control signal lines 31B are not arranged in the area between the driver 21 and the column control circuit 27. Therefore, the non-display area NAA decreases in size. This configuration is advantageous for decreasing an overall size of the liquid crystal display 10 or a frame size. In comparison to a configuration in which the locations of the first panel-side control output terminals and the second panel-side control output terminals are switched around, the lengths of the second control signal lines 31B in the driver 21 mounting area are smaller. Therefore, the driver 21 is less likely to mechanically interfere with the second control signal lines 31B and circuits in the diver 21 are less likely to be affected by noise.

More of the routing of the second control signal lines 31B will be described. As illustrated in FIG. 6, each of the second control signal lines 31B extends over the short edge 21S of the driver 21 along the X-axis direction toward the outside (toward the row control circuit 28). The second control signal line 31B then bends at a substantially right angle and extends along the Y-axis direction toward the column control circuit 27. The second control signal line 31B extends along the Y-axis direction for a predetermined distance. The second control signal line 31B includes an angled portion that is angled relative to the X-axis direction and the Y-axis direction. The angled portion extends toward the outside for a predetermined distance and then bends. The second control signal line 31B then extend along the Y-axis direction and reaches the short edge of the row control circuit 28. A portion of the second control signal line 31B is parallel to the adjacent first control signal line 31A (connected to the row control circuit 28). The portion is between a point where it bens at the angle and a point where it reaches the row control circuit 28.

As illustrated in FIG. 6, a portion of the second control signal line 31B has a larger width than a width of the first control signal line 31A. Namely, the second control signal line 31B extends from the second panel-side control output terminal 24B2 over the short edge 21S of the driver 21, that is, it is not arranged in an area between the driver 21 and the column control circuit 27. Therefore, even the width of the second control signal line 31B is larger than that of the first control signal line 31A, it is not necessary to expand the non-display area NAA. Because the second control signal line 31B has the smaller width, a line resistance thereof is smaller than a line resistance of the first control signal line 31A although the non-display area NAA is maintained small. One of two second control signal lines 31B (a clock signal control line) is for transmitting clock signals, which are control signals, to the row control circuit 28. The other second control signal line 31B (a power supply control line) is for transmitting power supply voltage signals, which are control signals, to the row control circuit 28. The second control signal line 31B for transmitting the clock signals is a kind of line that is not expected to cause dull edges on pulse waveforms of the clock signals. With the second control signal line 31B having the width larger than that of the first control signal line 31 and the lower line resistance, clock signals having stable pulse waveforms are supplied to the TFTs 17. The second control signal line 31B for the transmitting the power supply voltage signals is a kind of line that is not expected to cause a voltage drop to stably drive the row control circuit 28. With the second control signal line 31B having the width larger than that of the first control signal line 31 and the lower line resistance, the row control circuit 28 stably operates.

Specifically, as illustrated in FIG. 6, each of the second control signal lines 31B has two different widths. A portion having a smaller width is referred to as a small-width portion (a standard width portion) 33 and a portion having a larger width is referred to as a large-width portion (a larger width portion) 34. The width of the small-width portion 33 of the second control signal line 31B is substantially equal to the width of the first control signal line 31A. The width of the large-width portion 34 of the second control signal line 31B is larger than the width of the first control signal line 31A. The large-width portion 34 is a portion of the second control signal line 31B between the end connected to the second panel-side control output terminal 24B2 and an end of the angled portion that is angled relative to the X-axis direction and the Y-axis direction, respectively. The small-width portion 33 is a portion of the second control signal line 31B between the end connected to the row control circuit 28 and another end of the angled portion. The large-width portion 34 includes an entire portion of the second control signal line 31B arranged in the mounting area in which the driver 21 is mounted and a portion that extends out of the mounting area across the short edge 21S of the driver 21. In comparison to an area of the non-display area in which the small-width portion 33 is arranged, the area in which the large-width portion 34 is arranged is relatively larger. Therefore, the portion can have a sufficiently large width. With this configuration, the line resistance of the second control signal line 31B is sufficiently reduced while the non-display area NAA is maintained small.

Each of the first control signal lines 31A has the smaller width and the higher line resistance than the second control signal lines 31B. In this embodiment, the first control signal lines 31A are configured to transmit signals other than the clock signals and the power supply voltage signals (e.g., initial signals, start pulses, scanning direction switching signals.

As described above, the liquid crystal display device (a display device) 10 according to this embodiment includes the liquid crystal panel (a display panel) 11, the driver (a panel driver) 21, the panel-side output terminals 24A, and the control signal lines 31. The liquid crystal panel 11 includes the display area AA configured to display images and the non-display area NAA outside the display area AA. The driver (a panel driver) 21 is mounted in the non-display area NAA. The driver 21 is configured to process input signals from the control circuit board 12, which is an external signal source, and to generate output signals. The driver 21 sends the output signals to the display area AA to driver the liquid crystal panel 11. The driver 21 has the elongated shape that extends along the edge (the short edge) of the liquid crystal panel 11. The panel-side output terminals 24 are disposed in the non-display area NAA and connected to the driver 21. The image signal lines 30 are disposed in the non-display area NAA. The image signal lines 30 are routed from the panel-side image output terminals 24A of the panel-side output terminals 24 toward the display area AA in the fan-like form so as to cross the long edge 21L of the driver 21. The image signal lines 30 are configured to transmit the image signals included in the output signals. The control signal lines 31 are disposed in the non-display area NAA. The control signal lines 31 are routed from the panel-side control output terminals 24B of the panel-side output terminals 24 toward the display area AA. The control signal lines 31 are configured to transmit the control signals included in the output signals. The control signal lines 31 include the first control signal lines 31A and the second control signal lines 31B. The first control signal lines 31A are routed from the first panel-side control output terminals 24B1 of the panel-side output terminals 24 toward the display area AA along the image signal lines 30 so as to cross the long edge 21L of the driver 21. The second control signal lines 31 are routed from the second panel-side output terminals 24B2 so as to cross the short edge 21S of the driver 21. Each of the second control signal lines 31 includes at least a portion thereof having the width larger than the width of the first control line 31A.

With this configuration, the driver 21 mounted in the non-display area NAA of the liquid crystal panel 11 processes input signals from the control circuit board 12 that is an external signal source and generates output signals. The driver 21 outputs the output signals. The panel-side output terminals 24 arranged in the non-display area NAA are connected to the driver 21. Image signals and control signals included in the output signals from the driver 21 are transmitted to the display area AA through the image signal lines 30 and the control signal lines 31 via the panel-side output terminals 24. With this configuration, the liquid crystal panel 11 is driven.

In the non-display area NAA, the image signal lines 30 described above are routed from the panel-side image output terminals 24A of the panel-side output terminals 24 so as to cross the long edge 21L of the driver 21 and to spread toward the display area AA in a fan-like form. If all control signal lines are arranged to spread toward the display area AA in a fan-like form along the image signal lines 30 that are arranged to spread in the fan-like form, a distance between the panel-side output terminals 24 and the display area AA tends to become large. The control signal lines 31 include the first control signal lines 31A and the second control signal lines 31B. The first control signal lines 31A are routed from the first panel-side control output terminals 24B1 of the panel-side output terminals 24 toward the display area AA along the image signal lines 30 so as to cross the long edge 21L of the driver 21. The second control signal lines 31 are routed from the second panel-side output terminals 24B2 so as to cross the short edge 21S of the driver 21. Therefore, it is not necessary to arrange the second control signal lines 31B in the area between the panel-side output terminals 24 and the display area AA. Therefore, the distance between the panel-side output terminals 24 and the display area AA, that is, the non-display area NAA is maintained small. This configuration is preferable for reducing the overall size and the frame size of the liquid crystal display device 10.

The second control signal lines 31B are not arranged in the area between the panel-side output terminals 24 and the display area AA. Therefore, the widths of at least portions of the second control signal lines 31B can be made larger than the width of the first control signal line 31A without expanding the non-display area NAA. With this configuration, the line resistance of each second control signal line 31B is reduced while the size of the non-display area is kept small.

Each of the second control signal lines 31B includes the portion between the second panel-side control output terminal 24B2 of the panel-side output terminals 24 and the short edge 21S of the driver 21 and the portion outside the short edge 21S of the driver 21. The portions have the width larger than other portions. The portion between the second panel-side control output terminal 24B2 of the panel-side output terminals 24 and the short edge 21S of the driver 21 and the portion outside the short edge 21S of the driver 21 are arranged in the area of the non-display area NAA larger than an area thereof between the panel-side output terminals 24 and the display area AA. Therefore, the width of the portion of the second control signal line 31B can be increased, that is, the line resistance of the second control signal line 31B can be reduced while the non-display area NAA is maintained small.

The TFTs (switching components) 17 are arranged in the matrix in the display area AA. The row control circuit 28 is connected to ends of the control signal lines 31 closer to the display area AA and configured to control inputs of the control signals to the TFTs 17. The column control circuit 27 is connected to ends of the image signal lines 30 closer to the display area AA. The column control circuit 27 is configured to control inputs of the image signals to the TFTs 17. The inputs of the control signals from the control signal lines 31 to the TFTs 17 arranged in the matrix in the display area AA are controlled by the row control circuit 28. Furthermore, the inputs of the image signals from the image signal lines 30 to the TFTs 17 are controlled by the column control circuit 27. With this configuration, the TFTs 17 are properly driven and specified images are properly displayed in the display area AA.

The second control signal lines 31B include at least a clock control signal line and a power supply control signal line. The clock control signal line is configured to transmit clock signals, which are one kind of the control signals. The power supply control signal line is configured to transmit power supply control signals for driving at least one of the row control circuit 28 and the column control circuit 27.

Among the control signal lines 31, the clock control signal line is a kind of lines that is not expected to cause dull edges on the pulse waveform of the clock signals, which are control signals. The power supply control signal line is a kind of lines that is not expected to cause a voltage drop to stably drive the row control circuit 28 and the column control circuit 27. With the clock control signal line and the power source control signal line configured as the second control signal lines 31B that include at least portions having the larger widths, the line resistances thereof can be reduced. As a result, the clock signals having a stable pulse waveform are supplied to the TFTs 17. Furthermore, the row control circuit 28 and the column control circuit 27 are stably driven.

At least one of the first control signal lines 31A includes a zigzag portion 32 at a middle section thereof. At least one of the row control circuit 28 and the column control circuit 27 includes the ESD protection circuit electrically connected to the first control signal line 31A that includes the zigzag portion 32. With the zigzag portion 32, the line resistance of the first control signal line 31A is higher than a configuration without the zigzag portion 32. The first control signal line 31A that includes the zigzag portion 32 is electrically connected to at least one of the row control circuit 28 and the column control circuit 27 that includes the ESD protection circuit. Even if a surge is input to the first control signal line 31A that includes the zigzag portion 32 due to an electrostatic discharge, the surge is passed to the ESD protection circuit. With this configuration the driver 21 is protected from the surge.

The TFTs 17, the row control circuit 28, and the column control circuit 27 include polycrystalline silicon thin films. In comparison to amorphous silicon thin films, the electron mobility of the polycrystalline silicon thin films is higher. This configuration is advantageous for improving definition and reducing power consumption.

The first control signal lines 31A are connected to the first panel-side control output terminals 24B1 of the panel-side output terminals 24 that are arranged adjacent to the panel-side image output terminals 24A that are connected to the image signal lines 30. The second control signal lines 31B are connected to the second panel-side output terminals 24B2 of the panel-side output terminals 24 that are arranged adjacent to the panel-side output terminals 24B1 of the panel-side output terminals 24 that are connected to the first control signal line 31A and away from the panel-side image output terminals 24A of the panel-side output terminals 24 that are connected to the image signal lines 30. According to the configuration, lengths of portions of the second control signal lines 31B, which are routed from the second panel-side output terminals 24B of the panel-side output terminals 24 so as to cross the short edge 21S of the driver 21, in an area that overlaps the driver 21 are reduced. Therefore, mechanical interference is less likely to occur between the second control signal lines 31B and the driver 21. Furthermore, circuits in the driver 21 are less likely to be subjected to noise.

The panel-side input terminals 23 are disposed parallel to the panel-side output terminals 24 along the short edge 21S of the driver 21 in the non-display area NAA. The panel-side input terminals 23 are connected to the driver 21. The second control signal lines 31B are routed in the area between the panel-side output terminals 24 and the panel-side input terminals 23. Input signals from the control circuit boar 12, which is an external signal source, are transmitted to the driver 21 via the panel-side output terminals 24. The second control signal lines 31B are arranged in the area between the panel-side output terminals 24 and the panel-side input terminals 23 that are arranged parallel to each other and along a direction parallel to the short edge 21S of the driver 21. The second control signal lines 31B is routed so as to cross the short edge 21S of the driver 21.

The display panel is a liquid crystal display panel 11 including a pair of substrate 11a, 11b and liquid crystals 11c sealed between the substrates 11a, 11b. Applications of such a display device, that is, the liquid crystal display device 10 include electronic devices including personal digital assistances, mobile phones, notebook computers, and portable video game players.

The liquid display device 10 further includes the backlit unit (a lighting device) 14 arranged opposite the liquid crystal panel 11 and away from a display surface of the liquid crystal panel 11. The backlight unit 14 is configured to provide the liquid crystal panel 11 with light. Images are displayed in the display area AA of the liquid crystal panel 11 with the light provided by the backlight unit 14.

Second Embodiment

A second embodiment will be described with reference to FIGS. 7 and 8. The second embodiment includes inspection lines 35 and inspection terminals 36. Similar configurations, operations, and effects to the first embodiment will not be described.

Figure 7:
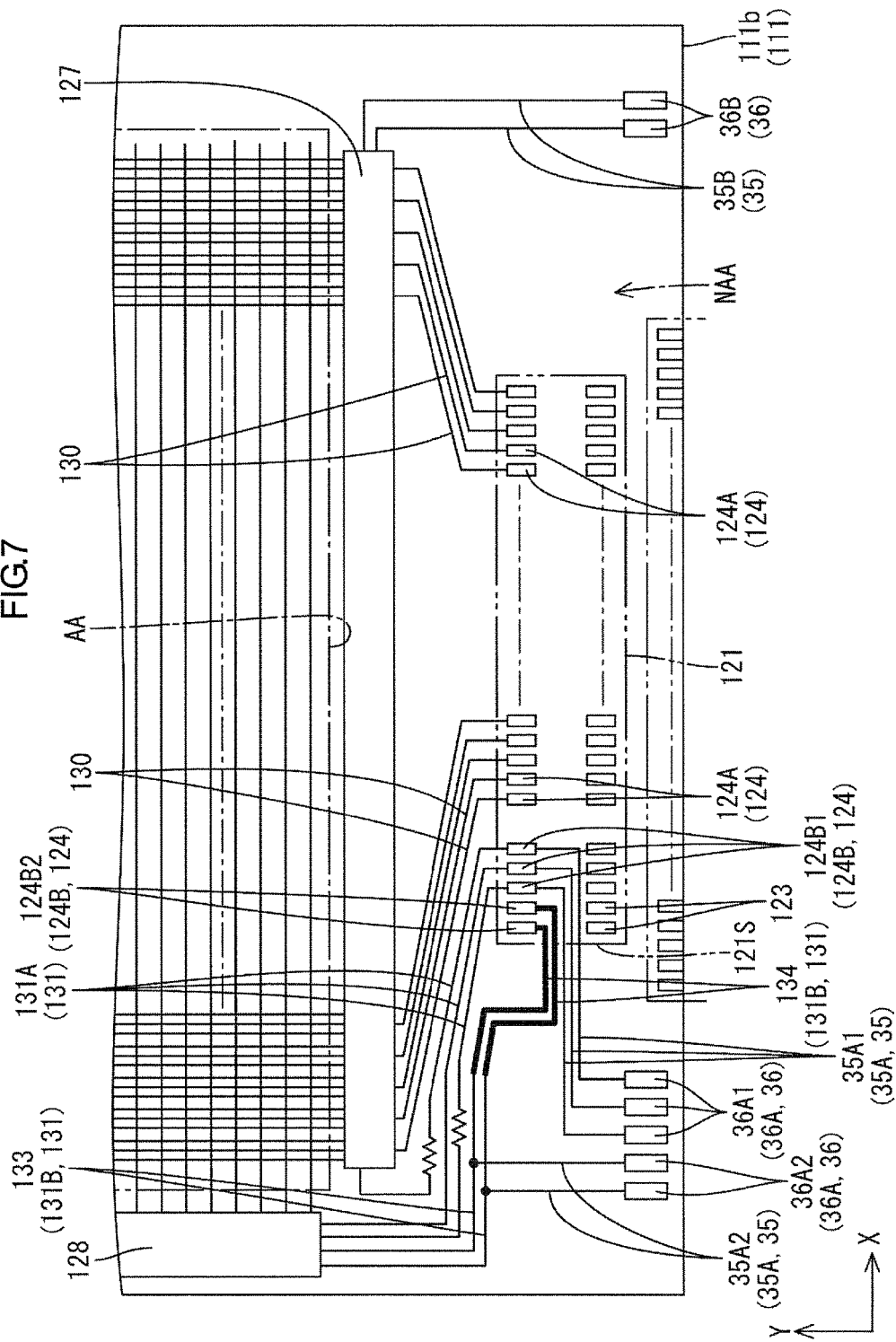
FIG. 7 is a plan view of an end portion of an array board in which a driver and a flexible circuit board are mounted illustrating routing of traces according to a second embodiment of the present invention.

As illustrated in FIG. 7, the inspection lines 35 are disposed in a non-display area NAA of an array board 111b according to this embodiment. The inspection lines 35 are for electrical inspections on control signal lines 131 and a column control circuit 127 when connected to them. In the non-display area NAA, the inspection terminals 36 are disposed. Ends of the inspection lines 35 away from the control signal lines 131 and the column control circuit 127 are connected to the inspection terminals 36. The inspections using the inspection lines 35 and the inspection terminals 36 are performed in a stage of the production process of a liquid crystal panel 111 before mounting of a driver 121. The inspection lines 35 include two kinds of lines, control signal line inspection lines 35A and column control circuit inspection lines 35B. An end of the control signal line inspection line 35A is connected to the corresponding control signal line 131. An end of each column control circuit inspection line 35B is connected to the column control circuit 127. The inspection terminals 36 include two kinds of terminals, control signal line inspection terminals 36A and column control circuit inspection terminals 36B. The control signal line inspection terminals 36A include terminals to which ends of the respective control signal line inspection line 35A is connected. Ends of the respective column control circuit inspection lines 35B are connected to the column control circuit inspection terminals 36B. In the following description, the control signal line inspection lines and the control signal line inspection terminals will be indicated by the reference numeral with the suffix A and the column control circuit inspection lines and the column control circuit inspection terminals will be indicted by the reference numeral with the suffix B when they need to be distinguished from each other. When they do not need to be distinguished from each other, the suffixes will not be added. Two column control circuit inspection terminals 36B are arranged in an area of the array board 111b on the right side in FIG. 7 with respect to the X-axis direction, that is, away from an area in which the row control circuit 128 (or the control signal lines 131). The column control circuit inspection lines 35B are connected to the respective column control circuit inspection terminals 36B and the short edge of the column control circuit 127 different from the short edge to which the first control signal line 131A is connected. Two column control circuit inspection lines 35B are parallel to each other. An inspection pad, which is not illustrated, is brought in contact with the column control circuit inspection terminals 36B to detect electrical defects such as broken lines and short-circuits.

Figure 8:
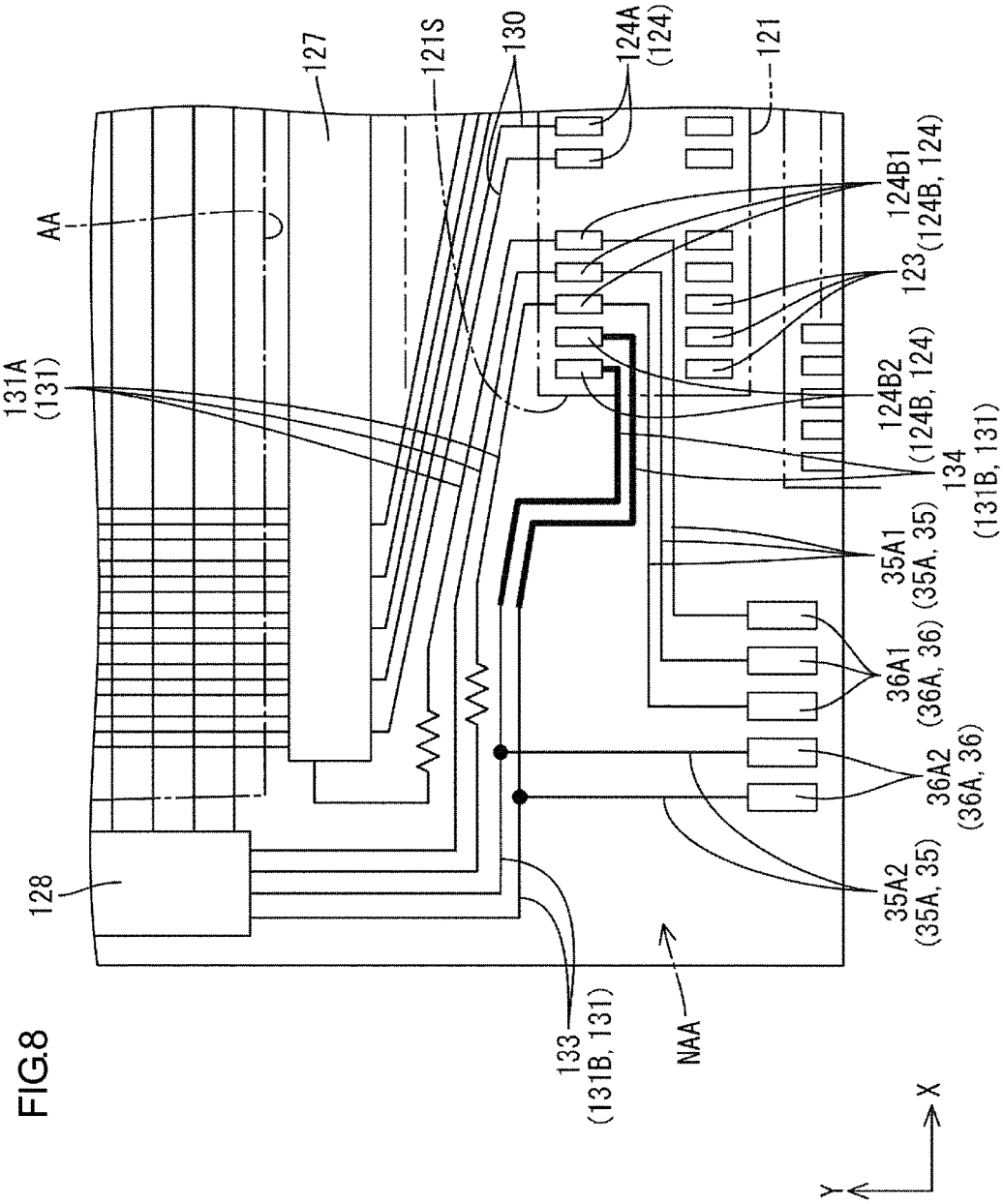
FIG. 8 is a plan view illustrating arrangement of control signal lines, panel-side output terminals, and inspection lines.

As illustrated in FIG. 8, five control signal line inspection terminals 36A are arranged along the X-axis direction in an area of the array board 111b opposite to the row control circuit 128 (or the display area AA) in the Y-axis direction with respect to the area in which the control signal lines 131 are arranged (close to the edge of the array board 111b). The control signal line inspection lines 35A according to this embodiment include first control signal line inspection lines (first inspection lines) 35A1 and second control signal line inspection lines (second inspection lines) 35A2. The first control signal line inspection lines 35A1 are connected to the respective first control signal lines 131A. The second control signal line inspection lines 35A2 are connected to the respective second control signal lines 131B. The control signal line inspection terminals 36A include first control signal line inspection terminals (first inspection terminals) 36A1 and second control signal line inspection terminals (second inspection terminals) 36A2. The first control signal line inspection terminals 36A1 are connected to the respective first control signal line inspection lines 35A1. The second control signal line inspection terminals 36A2 are connected to the respective second control signal line inspection lines 35A2. In the following description, regarding the control signal line inspection lines 35A and the control signal line inspection terminals 36A, the first control signal line inspection lines and the first control signal line inspection terminal will be indicated by the reference numeral with the suffix 1 and the second control signal line inspection lines and the second control signal line inspection terminal will be indicted by the reference numeral with the suffix 2 when they need to be distinguished from each other. When they do not need to be distinguished from each other, the suffixes will not be added.

As illustrated in FIG. 8, the first control signal line inspection lines 35A1 are connected to first panel-side control output terminals 124B1, respectively. The first panel-side control output terminals 124B1 are connected to the first control signal lines 131A. Specifically, each of the first control signal line inspection lines 35A1 extends from the first panel-side control output terminal 124B1 in an opposite direction to the column control circuit 127 (or the display area AA) along the Y-axis direction, that is, a direction perpendicular to the longitudinal direction of the driver 121. The first control signal line inspection line 35A1 bends at a substantially right angle at a point close to the corresponding panel-side input terminal 123 and extends in the X-axis direction. Namely, the first signal line inspection line 35A1 extends across a short edge 121S of the driver 121 to the outside of the mounting area in which the driver 121 is mounted. The first control signal line inspection lines 35A1 are routed along (or parallel to) the second control signal lines 131B. The first control signal line inspection lines 35A1 are routed in the mounting area between the second control signal lines 131B and the panel-side input terminals 123. The mounting area is an area in which the drover 121 is mounted. Namely, the first control signal line inspection lines 35A1 connected to the first panel-side control terminals 124B1 and the second control signal lines 131b connected to the second panel-side control terminals 124B2 are routed without crossing each other. The first control signal line inspection lines 35A1 that extend outside the mounting area in which the driver 121 is mounted extend outward in the X-axis direction and bend. The first control signal line inspection lines 35A1 are connected to the respective first control signal line inspection terminals 36A1. Because the first control signal line inspection lines 35A1 are connected to the respective first panel-side control output terminals 124B1, the first control signal lines 131A can be inspected for an entire length thereof for electrical defects such as broken lines and short-circuits by bringing an inspection pad, which is not illustrated, in contact with the first control signal line inspection terminals 36A1. A width of each first control signal line 131A is smaller than a large-width portion 134 of the second control signal line 131B. Therefore, broken lines are more likely to occur. Inspections on the first control signal lines 131A for the entire length thereof for broken lines or other defects are advantageous for reducing possibilities of shipping the liquid crystal panel 111 (or the liquid crystal display device) having a defect.

As illustrated in FIG. 8, the second control signal line inspection lines 35A2 are connected to portions of the respective second control signal lines 131B closer to the display area AA than the large-width portions 134, that is, small-width portions 133. Specifically, the second control signal line inspection lines 35A2 are connected to sections of the small-width portions 133 of the respective second control signal lines 131B. The sections extend along the X-axis direction. Each of the second control signal line inspection lines 35A2 extends from a connecting point to the corresponding second control signal line 131B in an opposite direction to the display area AA along the Y-axis direction. An end of the second control signal line inspection line 35A2 is connected to the second control signal line inspection terminal 36A2. Because the second control signal lines 131B is routed from the respective second panel-side control output terminals 124B2 so as to cross the short edge 121S of the driver 121, it is difficult to directly connect the second control signal line inspection lines 35A2 to the respective second panel-side control output terminals 124B2 due to the limited space. Namely, it is difficult to inspect the second control signal lines 131B for broken lines or other defects for the entire length using the second control signal line inspection lines 35A2. The small-width portions 133 of the second control signal lines 131B are more likely to break in comparison to the large-width portions 134. In this embodiment, the second control signal lines 131B are connected to the respective small-width portions 133. With this configuration, inspections are performed on the small-width portions 133 that are more likely to break. The large-width portions 134 of the second control signal lines 131B are less likely to break. Therefore, failures that relate to the large-width portions 134 are less likely to occur. Namely, the inspections are not necessary. This configuration is advantageous for reducing possibilities of shipping the liquid crystal panel 111 (or the liquid crystal display device) having a defect.

Next, an arrangement of the control signal line inspection terminals 36A will be described. As illustrated in FIG. 8, the first control signal line inspection terminals 36A1 are arranged closer to the panel-side control output terminals 124B, to which they are connected, with respect to the X-axis direction. The second control signal line inspection terminals 36A2 are arranged on the other side of the first control signal line inspection terminals 36A1 from the panel-side control output terminals 124B. Namely, the second control signal line inspection terminals 36A2 are farther from the panel-side control output terminals 124B than the first control signal line inspection terminals 36A1 with respect to the X-axis direction. The small-width portions of the second control signal lines 131B are arranged farther from the panel-side output terminals 124B than the large-width portions 134. Namely, the second control signal line inspection terminals 36A2 are arranged close to the small-width portions of the second control signal lines 131B to which they are connected. According to the above configuration, lengths of lines connected to the first control signal line inspection terminals 36A1 and the second control signal line inspection terminals 36A2 can be reduced as much as possible.

As described above, this embodiment includes the inspection lines 35 in the non-display area NAA. The inspection lines 35 are connected to the control signal lines 131 for inspecting continuity of the control signal lines 131. The inspection lines 35 include the first control signal line inspection lines (the first inspection lines) 35A1 and the second control signal line inspection lines (the second inspection lines) 35A2. The first control signal line inspection lines 35A1 are connected to the respective first panel-side control output terminals 124B1 of the panel-side output terminals 124 connected to the first control signal lines 131A. The second control signal line inspection lines 35A2 are connected to the portions of the respective second control signal lines 131B closer to the display area AA than the large-width portions. Because the first control signal line inspection lines 35A1 are connected to the respective first panel-side control output terminals 124B1 of the panel-side output terminals 124 connected to the first control signal lines 131A, the first control signal lines 131A having the smaller width can be inspected for broken lines. With this configuration, detectability of broken lines, if any, in the first control signal lines 131A improves. Therefore, the liquid crystal display device including the broken first control signal line 131A is less likely to be shipped. Because the second control signal lines 131B extend from the respective second panel-side control output terminals 124B2 of the panel-side output terminals 124 and cross the short edge 121S of the driver 121, it is difficult to directly connect the second control signal line inspection lines 35A2 to the respective second panel-side control output terminals 124B2 due to the limited space. The portions of the second control signal lines 131B having the smaller width (the small-width portions 133) closer to the display area AA are more likely to break in comparison to the portions of the second control signal lines 131B having the larger width (the large-width portions 134). The second control signal line inspection lines 35A2 are connected to the respective small-width portions 133. With this configuration, detectability of broken lines, if any, in the portions having the smaller width improves. The portions of the second control signal lines 131b having the larger width are less likely to break. Therefore, the liquid crystal display device including the broken second control signal line 131B is less likely to be shipped even through an inspection using the second control signal line inspection lines 35A2 is not performed.

The first control signal lines 131A are connected to the first panel-side control output terminals 124B1 of the panel-side output terminals 124. The first panel-side control output terminals 124B1 are arranged adjacent to the panel-side image output terminals 124A of the panel-side output terminals 124 connected to the image signal lines 130. The second control signal lines 131B are connected to the second panel-side control output terminals 124B2 of the panel-side output terminals 124. The second panel-side control output terminals 124B2 are arranged in an area adjacent to the first panel-side control output terminals 124B1 away from the panel-side image output terminals 124A of the panel-side output terminals 124 connected to the image signal lines 130. The first control signal line inspection lines 35A1 are routed from the first panel-side control output terminals 124B1 of the panel-side output terminals 124 connected to the first control signal lines 131A along the second control signal lines 131B so as to cross the short edge 121S of the driver 121. The first control signal line inspection lines 35A1 connected to the first panel-side control output terminals 124B1 of the panel-side output terminals 124 and the second control signal lines 131B are routed so as not cross each other. In comparison to a configuration in which they cross each other, the routing is simple.

The first control signal line inspection terminals (first inspection terminals) 36A1 and the second control signal line inspection terminals (second inspection terminals) 36A2 are disposed in the non-display area NAA. The first control signal line inspection terminals 36A1 are connected to the ends of the respective first control signal line inspection lines 35A1 arranged away from the first panel-side control output terminals 124B1 of the panel-side output terminals 124. The second control signal line inspection terminals 36A2 are connected to the ends of the respective second control signal line inspection lines 35A2 arranged away from the second control signal lines 131B. The second control signal line inspection terminals 36A2 are arranged adjacent to the first control signal line inspection terminals 36A1 and away from the first panel-side control output terminals 124B1 of the panel-side output terminals 124. The first control signal line inspection terminals 36A1 are arranged closer to the first panel-side control output terminals 124B1 of the panel-side output terminals 124 to which the first control signal line inspection lines 35A1 are connected. The second control signal line inspection terminals 36A2 are arranged closer to the second control signal lines 131B to which the second control signal line inspection lines 35A2 are connected. Therefore, the lengths of the first control signal line inspection lines 35a1 and the second control signal line inspection lines 35A2 connected to the terminals, respectively, can be reduced as much as possible.

Third Embodiment

A third embodiment will be described with reference to FIG. 9. The third embodiment includes panel-side control output terminals 224B disposed differently from the above embodiments. Similar configurations, operations, and effects to the first embodiment will not be described.

Figure 9:
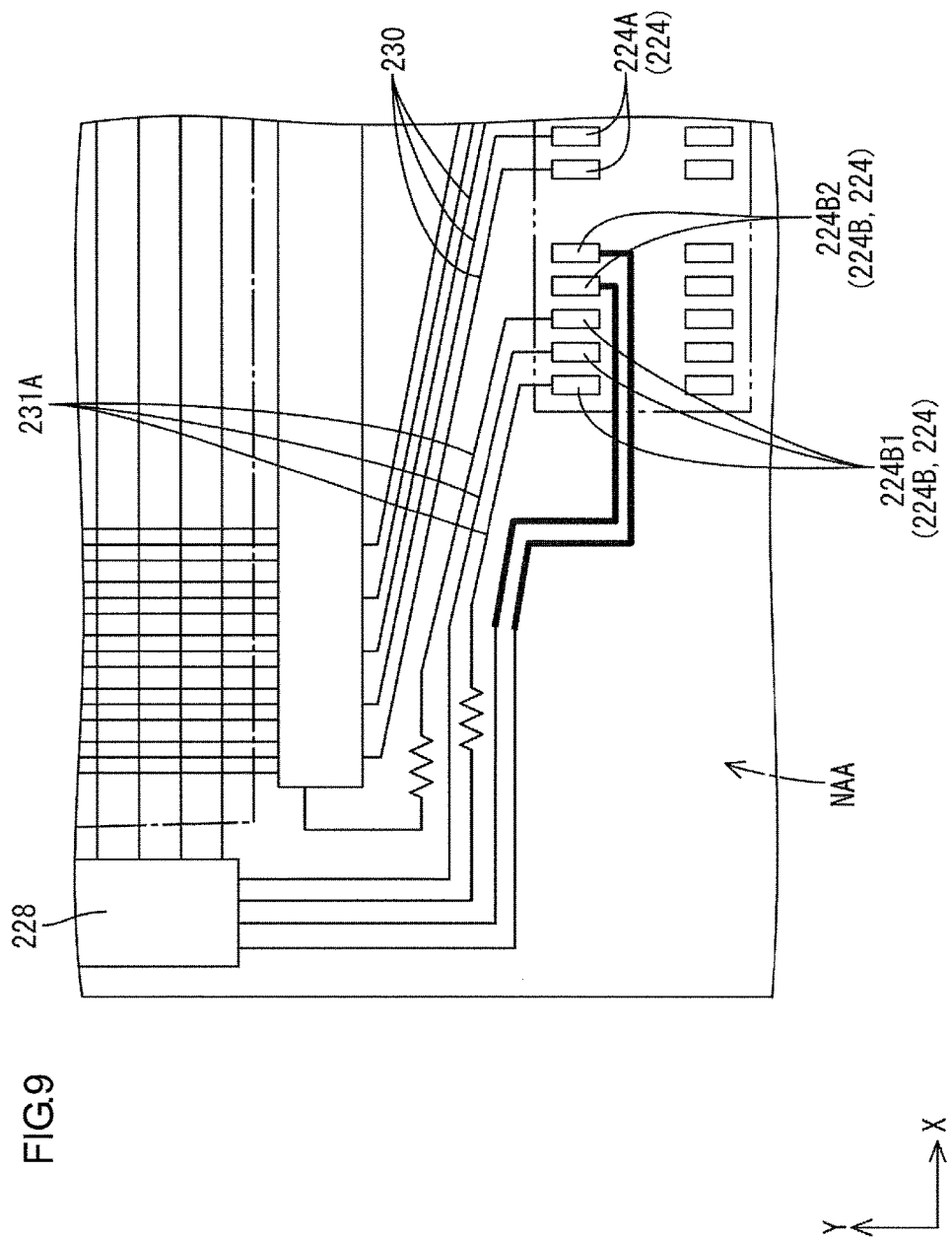
FIG. 9 is a plan view illustrating arrangement of control signal lines and panel-side output terminals according to a third embodiment of the present invention.

Regarding an arrangement of the panel-side output terminals 224, as illustrated in FIG. 9, second panel-side control output terminals 224B2 of the panel-side control output terminals 224B are arranged adjacent to panel-side image output terminals 224A. First panel-side control output terminals 224B1 are away from the panel-side image output terminals 224A that are adjacent to an area in which the panel-side output terminals 224 are arranged. The first panel-side control output terminals 224B1 are arranged closer to a row control circuit 228 among the panel-side output terminals 224. The first panel-side control output terminals 224B1 and the second panel-side control output terminals 224B2 of this embodiment are arranged the other way around relative to the arrangement of the first panel-side control output terminals 24B1 and the second panel-side control output terminals 24B2 in the first embodiment.

According this configuration, the distance between a group of the panel-side image output terminals 224A and a group of the first panel-side control output terminals 224B1 is larger in comparison to the first embodiment. Therefore, a larger space is provided between image signal lines 230 that extend from the terminals 224A and first control signal lines 231 that extend from the terminals 224B1. This configuration makes routing (or a layout) in the non-display area NAA easier.

Fourth Embodiment

A fourth embodiment will be described with reference to FIG. 10. The fourth embodiment includes panel-side control output terminals 324B disposed differently from the above embodiments. Similar configurations, operations, and effects to the first embodiment will not be described.

Figure 10:
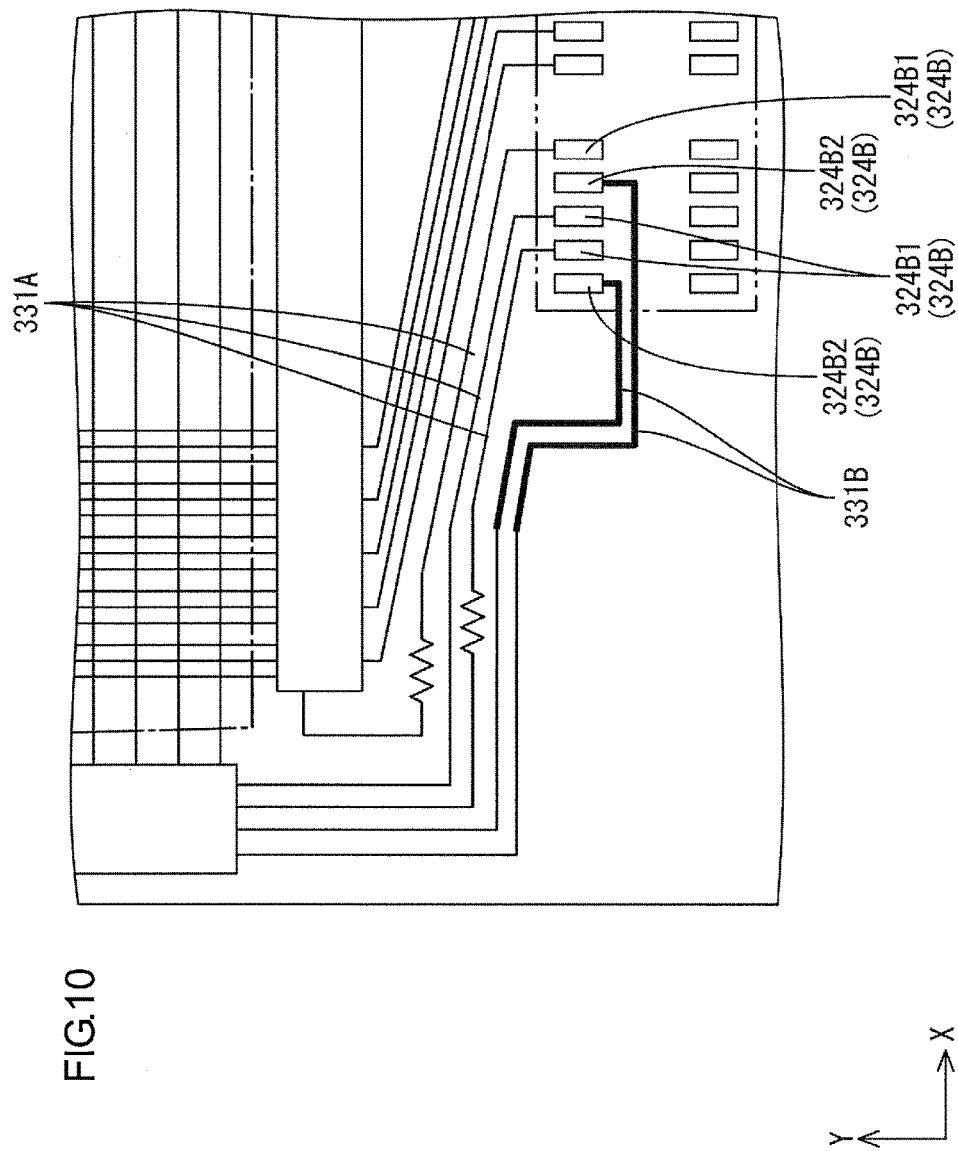
FIG. 10 is a plan view illustrating arrangement of control signal lines and panel-side output terminals according to a fourth embodiment of the present invention.

As illustrated in FIG. 10, the panel-side control output terminals 324B include first panel-side control output terminals 324B1 and second panel-side control output terminals 324B2 irregularly arranged. Specifically, one of two second panel-side control output terminals 324B2 is arranged at the far left in FIG. 10 among the panel-side control output terminals 324B. The other is arranged at the second from the right in FIG. 10 among the panel-side control output terminals 324B. One of three first panel-side control output terminals 324B1 is arranged at the far right in FIG. 10 among the panel-side control output terminals 324B. The other two are arranged at the third and the fourth from the right in FIG. 10 among the panel-side control output terminals 324B. The second panel-side control output terminal 324B2 at the second from the right in FIG. 10 among the panel-side control output terminals 324B is sandwiched between the first panel-side control output terminals 324B1 from the sides thereof. Two first panel-side control output terminals 324B1 arranged at the third and the fourth from the right in FIG. 10 are sandwiched between the second panel-side control output terminals 324B2 from the sides. With this configuration, a larger space is provided between first control signal lines 331A that extend from the respective first panel-side control output terminals 324B1. Furthermore, a larger space is provided between the second control signal lines 331B that extend from the respective second panel-side control output terminals 324B2.

Fifth Embodiment

A fifth embodiment will be described with reference to FIG. 11. The fifth embodiment includes second control signal lines 431B including small-width portions 433 and large-width portions 434, locations of which are different from small-width portions and large-width portions of the second embodiment. Similar configurations, operations, and effects to the second embodiment will not be described.

Figure 11:
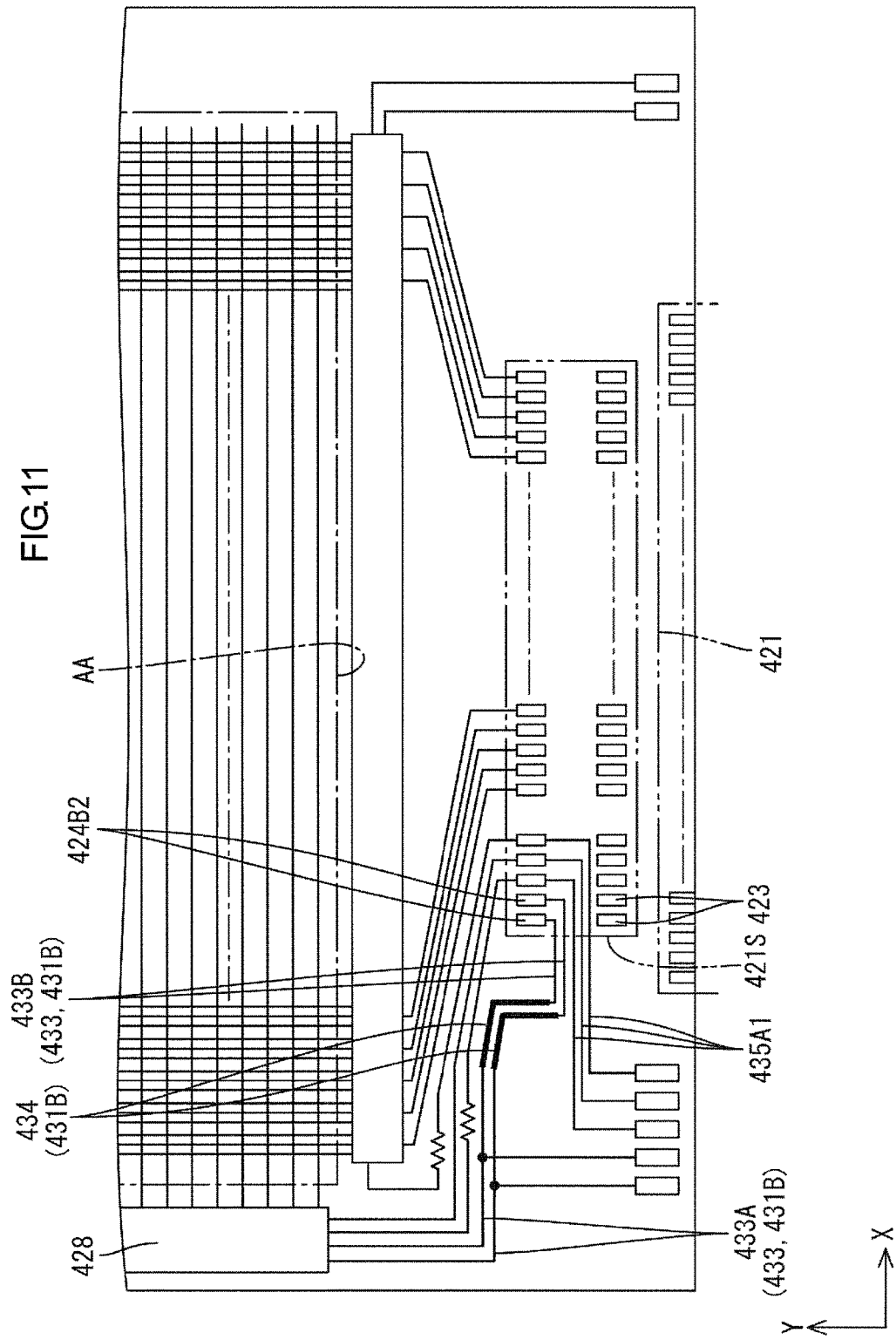
FIG. 11 is a plan view of an end portion of an array board in which a driver and a flexible circuit board are mounted illustrating routing of traces according to a fifth embodiment of the present invention.

As illustrated in FIG. 11, each of the second control signal lines 431B of this embodiment includes two small-width portions 433 and a large-width portion 434 located between the small-width portions 433. Specifically, the small-width portions 433 include a first small-width portion 433A and a second small-width portion 433B. The first small-width portion 433A includes a first end connected to a row control circuit 428. The second small-width portion 433B includes a second end connected to a second panel-side control output terminal 424B2. The first small-width portion 433A extends from the row control circuit 428 to an end of an angled portion of the second control signal line 431B. In the angled portion, the second control signal line 431B is angled relative to the X-axis direction and the Y-axis direction. The second small-width portion 433B extends from a second panel-side control output terminal 424B2 to an end of a portion of the second control signal line 431B along the X-axis direction. The portion extends across a short edge of a driver 421 to the outside of the driver 421. The second small-width portion 433B includes a portion of the second control signal line 431B between the second panel-side control output terminal 424B2 and the short edge 421S of the driver 421 (in amounting area in which the driver 421 is mounted) and a portion of the second control signal line 431B outer than the short edge 421S of the driver 421 (outside the mounting area). A portion of the second small-width portion 433B inside the mounting area is parallel to first control signal line inspection lines 435A1 that are adjacently arranged in an area between the second panel-side control output terminals 424B2 and panel-side input terminals 423.

The large-width portion 434 of each second control signal line 431B includes the angled portion that are angled relative to the X-axis direction and the Y-axis direction and a portion of the second control signal line 431B along the Y-axis direction. The portion extends from the end of the angled portion downward in FIG. 11 (in a direction opposite to the row control circuit 428 and the display area AA). Ends of the large-width portion 434 are connected to the end of the first small-width portion 433A and the end of the second small-width portion 433B, respectively. The large-width portion 434 of the second control signal line 431B is arranged outer than the short edge 421S of the driver 421 relative to the driver 421, that is, outside the mounting area in which the driver 421 is mounted.

In this embodiment, the portion of each second control signal line 431B between the second panel-side control output terminal 424B2 and the short edge 421S of the driver 421 is configured as the small-width portion 433 (the second small-width portion 433B). Even if a sufficient size of space for the first control signal line inspection lines 435A1 is not provided in an area between the second panel-side control output terminals 424B2 and the panel-side input terminals 423 in the mounting area in which the driver 421 is mounted, the second control signal lines 431B can be routed in the area.

Other Embodiments

The present invention is not limited to the embodiments described above and illustrated by the drawings. For examples, the following embodiments will be included in the technical scope of the present invention.

(1) Lengths (or percentages) of the small-width portions and the large-width portions of the second control signal lines can be modified from those in the above embodiments. For the modification of the lengths of the small-width portions and the large-width portions, it is preferable to arrange at least the large-width portions in an area outer than the short edge of the driver relative to the driver. Specifically, in the configuration of the first embodiment (i.e., the configuration not including the inspection lines and the inspection terminals), the second control signal lines may be configured similar to the second control signal lines in the fifth embodiment. If the mounting area in which the driver is mounted has a large empty space in which the lines are not arranged, widths of portions of the second control signal lines between the second panel-side control terminals and the short edge of the driver (inside the mounting area in which the driver is mounted) may be increased.

(2) For the modification of the widths and the lengths of the second control signal lines in the fifth embodiment as in the above embodiment (1), portions of the second control signal lines between connecting points of the inspection lines and the short edge of the driver may be configured as large-width portions. The large-width portions may be extended farther than the connecting points of the inspection lines toward the row control circuit.

(3) For the modification of the widths and the lengths of the second control signal lines in the fifth embodiment as in the above embodiment (1), the second control signal lines may include multiple small-width portions or large-width portions.

(4) In the above embodiments, each second control signal line include two different widths in different portions, that is, the small-width portion and the large-width portion. However, the second control signal line may include three or more different widths.

(5) In the above embodiments, a portion of each second control signal line has a larger width than the first control signal line. However, the second control signal line may have a width larger than the first control signal line for an entire length thereof.

(6) In the above embodiments, the width of the small-width portion of each second control signal line is substantially equal to the width of the first control signal line. However, the width of the small-width portion of the second control signal line may be smaller or larger than that of the first control signal line.

(7) In the above embodiments, the first control signal lines include those connected to the column control circuit. However, the second control signal lines may include those connected to the column control circuit. In this case, an arrangement similar to the arrangement in the third embodiment (the second panel-side control output terminals are arranged adjacent to the panel-side image output terminals) is preferable.

(8) In the above embodiments, the first control signal lines include those including zigzag portions. However, the zigzag portions may be replaced with small-width portions formed by partially reducing widths of the first control signal lines to increase resistances. The purpose of the zigzag portions is to provide resistance portions for increasing the line resistances in portions of the first control signal lines. Therefore, structures other than zigzag portions are acceptable as long as the purpose is achieved.

(9) The inspection lines and the inspection terminals in the second embodiment are for inspections in the production process of the liquid crystal panels. However, the inspection lines and the inspection terminals may be used for driving the liquid crystal panels.

(10) The connecting points of the second control signal line inspection lines to the second control signal lines may be modified from the second embodiment. For example, the connecting points may be set at the ends of the angled portions of the second control lines.

(11) In the second embodiment, the inspection lines are connected to all control signal lines, respectively. However, the inspection lines may be connected to only some of the control signal lines. Furthermore, a single inspection line may be connected to multiple control signal lines.

(12) The arrangements of the panel-side output terminals and the control signal lines can be modified from those in the third and the fourth embodiments.

(13) In the above embodiments, the column control circuit and the row control circuit are arranged in the non-display area of the array board. However, the column control circuit and the row control circuit may be omitted and functions of those may be performed by the driver.

(14) In the above embodiments, the semiconductor films in the TFTs, the column control circuit, and the row control circuit are CG silicon thin films. However, other kinds of semiconductor films such as amorphous silicon (a-Si) films and oxide semiconductor (IGZO: InGaZnOx) films may be used.

(15) In the above embodiments, the liquid crystal panel has a vertically long rectangular shape. However, horizontally long rectangular liquid crystal panels and square liquid crystal panels are included in the scope of the present invention.

(16) Liquid crystal panels including the liquid crystal panels in the above embodiments and functional panels overlaid and attached to the liquid crystal panels are included in the scope of the present invention. The functional panels include touch panels and parallax barrier panels (switch liquid crystal panels).

(17) In the above embodiments, the edge-light type backlight unit is used. However, a direct type backlight unit may be used.

(18) The transmissive liquid crystal display device including the backlight unit, which is an external light source, is provided as an example. However, a reflective liquid crystal display device using ambient light for display is included in the scope of the present invention. In this case, the backlight unit is not required.

(19) In the above embodiments, the TFTs are used for switching components of the liquid crystal display device. However, a liquid crystal display device including switching components other than the TFTs (e.g., thin film diodes (TFDs)) is included in the scope of the present invention. A color liquid crystal display and a black-and-white liquid crystal display are also included in the scope of the present invention.

(20) The liquid crystal display device including the liquid crystal panel as a display panel is provided as an example. However, a display device including other kind of display panel (e.g., a plasma display panel) and a display device including organic EL panel are included in the scope of the present invention. In such display devices, the backlight unit is not required.

(21) In the above embodiments, the liquid crystal panel that is classified as a small sized or a small to middle sized display and used for PDAs, mobile phones, notebook computers, digital photo frames, portable video games, and electronic papers is provided as an example. Liquid crystal panels that are classified as middle sized or large sized (or supersized) displays having screen sizes from 20 inches to 90 inches are included in the scope of the present invention. Such display panels may be used in electronic devices such as television devices, digital signage, and electronic blackboard.

EXPLANATION OF SYMBOLS

10: liquid crystal display device (display device), 11, 111: liquid crystal panel (display panel), 11a: CF board (board), 11b, 111b: alley board (board), 11c: liquid crystal layer (liquid crystal), 12: control circuit board (external signal source), 14: backlight unit (lighting unit), 17: TFT (switching component), 21, 121, 421: driver (panel driver), 21L: long edge, 21S, 121S, 421S: short edge, 23, 123, 423: panel-side input terminal, 24, 124, 224: panel-side output terminal, 24A, 124A, 224A: panel-side image output terminal (panel-side output terminal), 24B, 124B, 224B, 324B:

panel-side control output terminal (panel-side output terminal), 24B1, 124B1, 224B1, 324B1: first panel-side control output terminal (panel-side output terminal), 24B2, 124B2, 224B2, 324B2, 424B2: second panel-side control output terminal (panel-side output terminal), 27, 127: column control circuit, 28, 128, 228, 428: row control circuit, 30, 130, 230: image signal line, 31, 131: control signal line, 31A, 131A, 231A, 331A: first control signal line, 31B, 131B, 331B, 431B: second control signal line (clock control signal line, power supply control signal line), 32: zigzag portion, 35: inspection line, 35A: control signal line inspection line (inspection line), 35A1, 435A1: first control signal line inspection line (first inspection line), 35A2: second control signal line inspection line (second inspection line), 36: inspection terminal, 36A: control signal line inspection terminal (inspection terminal), 36A1: control signal line inspection terminal (first inspection terminal), 36A2: control signal line inspection terminal (second inspection terminal), AA: display area, NAA: non-display area

The invention claimed is:

1. A display device comprising:
a display panel including a display area that displays images and a non-display area outside the display area;
a panel driver in the non-display area that drives the display panel by using input signals supplied by an external signal source, the panel driver having an elongated shape with a longitudinal direction thereof along an edge of the display panel;
panel-side output terminals in the non-display area and connected to the panel driver;
image signal lines in the non-display area and routed from the panel-side output terminals to cross a long edge of the panel driver and fan out toward the display area, the image signal lines transmitting image signals included in output signals; and
control signal lines in the non-display area and routed from the panel-side output terminals toward the display area, the control signal lines transmitting control signals included in the output signals; wherein
the control signal lines include:
one or more first control signal lines routed from the panel-side output terminals to cross the long edge of the panel driver toward the display area; and
one or more second control signal lines routed from the panel-side output terminals to cross a short edge of the panel driver;
the one or more first control signal lines include portions which are parallel or substantially parallel to the image signal lines;
the display device further comprises panel-side input terminals parallel to the panel-side output terminals along the long edge of the panel driver in the non-display area, the panel-side input terminals being connected to the panel driver, and
the one or more second control signal lines are routed in an area between the panel-side output terminals and the panel-side input terminals.

2. The display device according to claim 1, wherein the control signal lines are connected to a row control circuit or a column control circuit.

3. The display device according to claim 2, further comprising:
a row control circuit connected to scanning lines in the display area; and
a column control circuit connected to data lines in the display area, wherein
the one or more first control signal lines and the one or more second control signal lines connect at least one of the row control circuit and the column control circuit to the panel driver.

4. The display device according to claim 3, wherein
the row control circuit is located at ends of the scanning lines;
the column control circuit is located at ends of the data lines, and
the column control circuit is disposed between the panel driver and the display area.

5. The display device according to claim 1, wherein the one or more first control signal lines are routed parallel or substantially parallel to portions of the image signal lines which are routed in a fan-shaped pattern.

6. The display device according to claim 1, further comprising inspection lines connected to the one or more first control signal lines and the one or more second control signal lines in the non-display area to inspect continuity of the one or more first control signal lines and the one or more second control signal lines, the inspection lines including:
one or more first inspection lines connected to the panel-side output terminals that are connected to the one or more first control signal lines; and
one or more second inspection lines connected to a portion of the one or more second control signal lines.

7. The display device according to claim 6, wherein
the one or more first control signal lines are connected to the panel-side output terminals adjacent to the panel-side output terminals that are connected to the image signal lines,
the one or more second control signal lines are connected to the panel-side output terminals adjacent to the panel-side output terminals that are connected to the one or more first control signal lines away from the panel-side output terminals connected to the image signal lines, and
the one or more first inspection lines are routed from the panel-side output terminals that are connected to the one or more first control signal lines to cross the short edge of the panel driver.

8. The display device according to claim 7, further comprising first inspection terminals and second inspection terminals in the non-display area, wherein
the first inspection terminals are connected to ends of the one or more first inspection lines away from ends thereof closer to the panel-side output terminals, and
the second inspection terminals are connected to ends of the one or more second inspection lines away from ends thereof closer to the one or more second control signal lines and adjacent to the first inspection terminals away from the panel-side output terminals.

9. The display device according to claim 1, further comprising:
switching components in a matrix in the display area; and
a row control circuit and a column control circuit in the non-display area, wherein the row control circuit is connected to ends of the one or more first control signal lines and the one or more second control signal lines closer to the display area, the row control circuit controls inputs of the one or more first control signal lines and the one or more second control signal lines to the switching components, and
the column control circuit is connected to ends of the image signal lines closer to the display area, the column control circuit controls inputs of the image signals to the switching components.

10. The display device according to claim 9, wherein the one or more second control signal lines include at least one of:
a clock control signal line that transmits clock signals; and
a power supply control signal line that transmits power supply control signals to drive at least one of the column control circuit and the row control circuit.

11. The display device according to claim 9, wherein
at least one of the one or more first control signal lines includes a zigzag portion, and at least one of the row control circuit and the column control circuit includes an electro-static discharge (ESD) protection circuit electrically connected to the at least one first control signal line including the zigzag portion.

12. The display device according to claim 9, wherein the switching components, the row control circuit, and the column control circuit include polycrystalline silicon thin films.

13. The display device according to claim 1, wherein
the one or more first control signal lines are connected to the panel-side output terminals adjacent to the panel-side output terminals that are connected to the image signal lines, and
the one or more second control signal lines are connected to the panel-side output terminals adjacent to the panel-side output terminals that are connected to the one or more first control signal lines and away from the panel-side output terminals that are connected to the image signal lines.

14. The display device according to claim 1, wherein at least one of the one or more second control signal lines are connected to one of the panel-side output terminals between one of the panel-side output terminals connected to one of the one or more first control signal lines and one of the panel-side output terminals connected to one of the image signal lines.

15. The display device according to claim 1, wherein at least one of the one or more first control signal lines are connected to one of the panel-side output terminals between a pair of the panel-side output terminals each connected to one of the one or more second control signal lines, respectively.

16. The display device according to claim 1, wherein the display panel is a liquid crystal display panel including a pair of substrates and liquid crystals sealed between the substrates.

17. The display device according to claim 16, further comprising a lighting device opposite the liquid crystal display panel and away from a display surface of the liquid crystal display panel, the lighting device to provide the liquid crystal display panel with light.

* * * * *